United States Patent [19]

Atkins et al.

[11] Patent Number: 6,125,375

[45] Date of Patent: *Sep. 26, 2000

[54] APPARATUS FOR VISUALIZING PROGRAM SLICES

[75] Inventors: David L. Atkins; Thomas J. Ball; Stephen Gregory Eick, all of Naperville; Graham John Wills, Lisle, all of Ill.

[73] Assignee: Lucent Technologies, Inc., Murray Hill, N.J.

[ * ] Notice: This patent is subject to a terminal disclaimer.

[21] Appl. No.: 09/001,291

[22] Filed: Dec. 31, 1997

Related U.S. Application Data

[60] Division of application No. 08/317,081, Oct. 3, 1994, Pat. No. 5,793,369, which is a continuation-in-part of application No. 08/296,612, Aug. 26, 1994, Pat. No. 5,742,777, which is a continuation of application No. 07/802,912, Dec. 6, 1991, abandoned.

[51] Int. Cl.[7] ............................................ G06F 19/00
[52] U.S. Cl. ................................... 707/502; 707/528
[58] Field of Search ..................................... 707/502, 526, 707/528; 345/431, 440

[56] References Cited

U.S. PATENT DOCUMENTS 5,793,369   8/1998   Atkins et al. ........................... 345/339

FOREIGN PATENT DOCUMENTS 0 545 583   6/1993   European Pat. Off. .
2137788A   10/1984   United Kingdom .

OTHER PUBLICATIONS

Thomas Ball et al., "Visualizing Program Slices", *Proceedings of the IEEE Symposium on Visual Languages*, Oct. 4–7, 1994, St. Louis, MO, pp. 288–295.

James R. Larus, "Efficient Program Tracing", *Computer*, vol. 26, No. 5, May 1993, pp. 52–61.

H. Agrawal et al., "Debugging With Dynamic Slicing and Backtracking", *Software Practice & Experience*, vol. 23, No. 6, Jun. 1993, Chichester, GB, pp. 589–616.

Velleman, Learning Data Analysis with Data Desk, 1989, pp. 101–109, 113, 114.

Kilpatrick et al., "Program Slicing: A Computer Aided Programming Technique", *Software Engineering 88*, Jul. 1988, pp. 60–64.

Lyle et al., A Program Decomposition Scheme with Applications to Software Modification and Testing, *System Sciences 1989 Annual Hawaii Intl. Conf.*, Jan. 3, 1989, pp. 479–485.

Gallagher et al., "Using Program Slicing in Software Maintenance", *IEEE Transactions on Software Engineering*, Aug. 1991, pp. 751–761.

*Primary Examiner*—Stephen S. Hong

[57] ABSTRACT

Apparatus for visualizing slices of transitive closures of entities having dependence relationships with one another. A preferred embodiment visualizes slices of programs. A display in a computer system includes reduced representations of the files, procedures, and lines making up a program. The user employs a pointing device to interactively select a reduced representation as the slice point and the apparatus computes the slice and changes the color of the reduced representations in the slice. The color of the reduced representation indicates the distance of the entity represented by the reduced representation from the slice point. The display may be rearranged so that files and procedures are ordered by distance from the slice point. Other aspects of the display include scaling the size of the reduced representation of a procedure to indicate the number of lines in the procedure and filling the reduced representation of the procedure according to the number of lines belonging to the slice which are contained in the procedure. A user may select open and closed representations of procedures. The open representation of a procedure contains reduced representations of the lines in the procedure. The apparatus also includes a viewer for viewing the text of lines in the program.

24 Claims, 14 Drawing Sheets

CODE VIEWER OBJECT 1401

START 2307

APPARATUS FOR VISUALIZING PROGRAM SLICES

This application is a divisional of U.S. Ser. No. 08/317,081, D. L. Atkins et al,. Apparatus For Visualizing Program Slices, filed Oct. 3, 1994, now U.S. Pat. No. 5,793,369 issued Aug. 11, 1998 which in turn is a continuation-in-part of U.S. Ser. No. 08/296,612, S. G. Eick, Apparatus for Selective Simultaneous display of Information about a Plurality of Entities, filed Aug. 26, 1994, now U.S. Pat. No. 5,742,777 issued Apr. 28, 1998 which is in turn a continuation of U.S. Ser. No. 07/802,912, S. G. Eick, Information Display Apparatus, filed Dec. 6, 1991, now abandoned.

BACKGROUND OF THE INVENTION

1. Field of the Invention

The invention concerns the display of information in a digital computer system and more particularly concerns the display of information about dependencies among entities in a very large set thereof.

2. Description of the Prior Art

A major problem for users of computer systems is that displays of information accessible through the computer system generally provide either a very high level view of the information or a very detailed view of the information, while the user often needs a view of the information which is at an intermediate level. For example, text files are represented in their entirety by icons or file names, and once a text file has been selected, a number of lines in the file can be displayed in a window. There is, however, no display of information which gives a reasonable idea of how the lines presently displayed in the window relate to the lines in the entire file. One consequence of the lack of such an intermediate level of display information is that it becomes difficult to use and understand available information.

The foregoing problem was addressed by the parent of the present patent application, which disclosed novel apparatus for displaying information about a very large number of entities and filtering the information so that a user of the information could see patterns which were of interest to him in it. The information display techniques of the parent have many applications, including scroll bars which better show the relationship between text in a window and the remainder of the text, television program selection interfaces which can information about a very large number of television programs, apparatus for displaying information about the history of lines of code in a large software system, all disclosed in the parent of the present patent application, apparatus for displaying information from an error log file, disclosed in U.S. Ser. No. 08/126,846, S. G. Eick, et al., Method and Apparatus for Graphical Analyzing a Log file, filed Sep. 24, 1993, and apparatus for displaying information about data base schemata, disclosed in U.S. Ser. No. 08/141,885, S. G. Eick, et al., Graphical Display of Relationships, filed Oct. 22, 1993.

In the present application, the techniques disclosed in the parent are applied to the problem of visualizing dependency relationships. In the preferred embodiment, the technique is used to visualize program slices. Informally stated, a program slice contains those components of a program that can potentially affect some component of interest. That component is termed the slice point. A program slice aids program understanding by focusing attention on a smaller and relevant subprogram. Program slicing as an automated technique for decomposing programs, was proposed by Mark Weiser in Weiser, M., "Programmers use slices when debugging", *Communications of the ACM*, Vol. 25(7) pp. 446–452 (July 1982) and Weiser, M., "Program slicing", *IEEE Transactions on Software Engineering,* Vol. SE-10(4) pp. 352–357 (July, 1984).

The usefulness of program slicing as a technique for studying programs is limited by the user interfaces presently employed to examine program slices. The current slicing interfaces are based on text browsers or syntax-directed editors. See for example Agrawal, H., DeMillo, R. A., and Spafford, E. H., "Debugging with dynamic slicing and backtracking", *Software-Practice and Experience,* Vol. 23(6) pp. 589–616 (June 1993) and Gallagher, K. B., "Surgeon's assistant limits side effects", *IEEE Software* Vol. 7 p. 64 (May 1990). In these interfaces, a slice is formed by selecting a statement or expression as the slice point and invoking a slice command. As a result, statements in the slice, i.e., those statements which potentially affect the component of interest, are highlighted or colored. If the slice crosses procedure or file boundaries, additional browsers may be opened or browser commands may be invoked to view other entities. Such interfaces do permit examination of a slice, but they burden the programmer with the task of determining the extent of a slice and determining the relationship of the slice to the remainder of the code. Moreover, navigation through a slice is cumbersome, especially when the slice crosses procedure and file boundaries, as is generally the case in large programs In point of fact, the present text-based interfaces do more to hide the slice than they do to disclose it. It is an object of the apparatus and techniques disclosed in the following to overcome these problems and make slicing into a truly useful technique for analyzing computer programs.

SUMMARY OF THE INVENTION

The problems of the prior-art program slice apparatus are solved by program slice visualization apparatus which displays reduced representations of the lines, procedures, and files making up the program. The user employs a pointer controlled by a pointing device such as a mouse to select one of the reduced representations as a slice point. The apparatus then computes the slice and alters the appearance of those reduced representations which belong to the slice. The apparatus thus permits visualization of slices which cross procedure and file boundaries. A viewer permits the user to examine the entities represented by the reduced representations in detail.

Further aspects of the program slice visualization apparatus include the use of color to show the distance of an entity belonging to a slice from the slice point and the use of "openable" procedure representations in the display. When the user opens the procedure representation, a new procedure representation appears in which there is a reduced representation of each line in the procedure. Line representations is that belong to the slice have an altered appearance. The procedure representations may further vary in size according to the number of lines they contain and may be filled according to the number of lines which are in the slice. Other options permit the user to suppress display of reduced representations which are not in the slice and to rearrange the file and procedure representations in the display by distance from the slice point.

The techniques of the invention may be used not only to visualize program slices, but also to visualizes slices of any set of entities for which a dependence graph may be made. The foregoing and other aspects and objects of the techniques and apparatus disclosed herein will be apparent to those of ordinary skill in the art after perusal of the following Drawing and Detailed Description, wherein:

DETAILED DESCRIPTION

Figure 1:
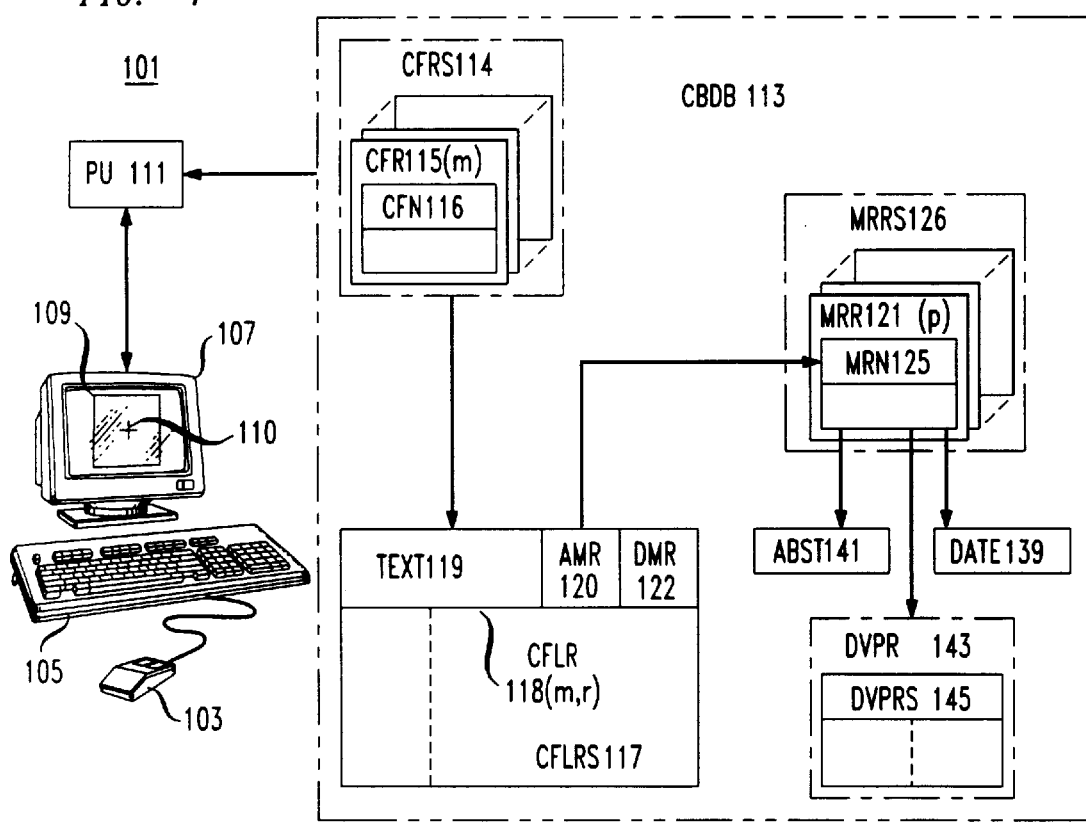
FIG. 1 is a diagram of a system in which a preferred embodiment is employed.
Figure 4:
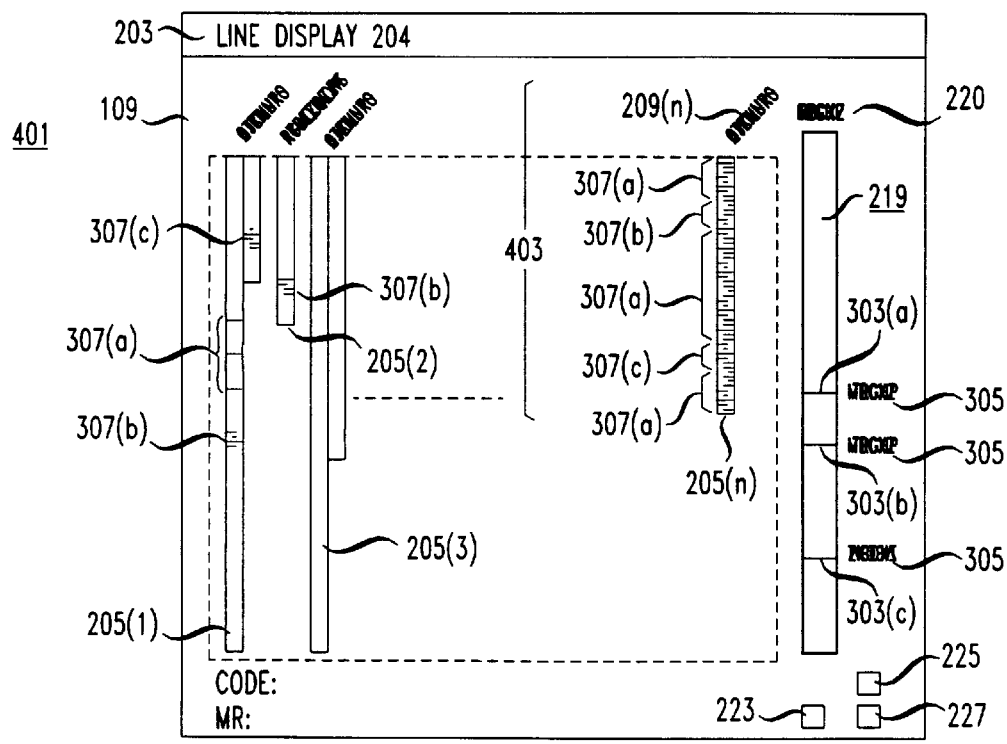
FIG. 4 is a diagram of a third display produced by the preferred embodiment.
Figure 5:
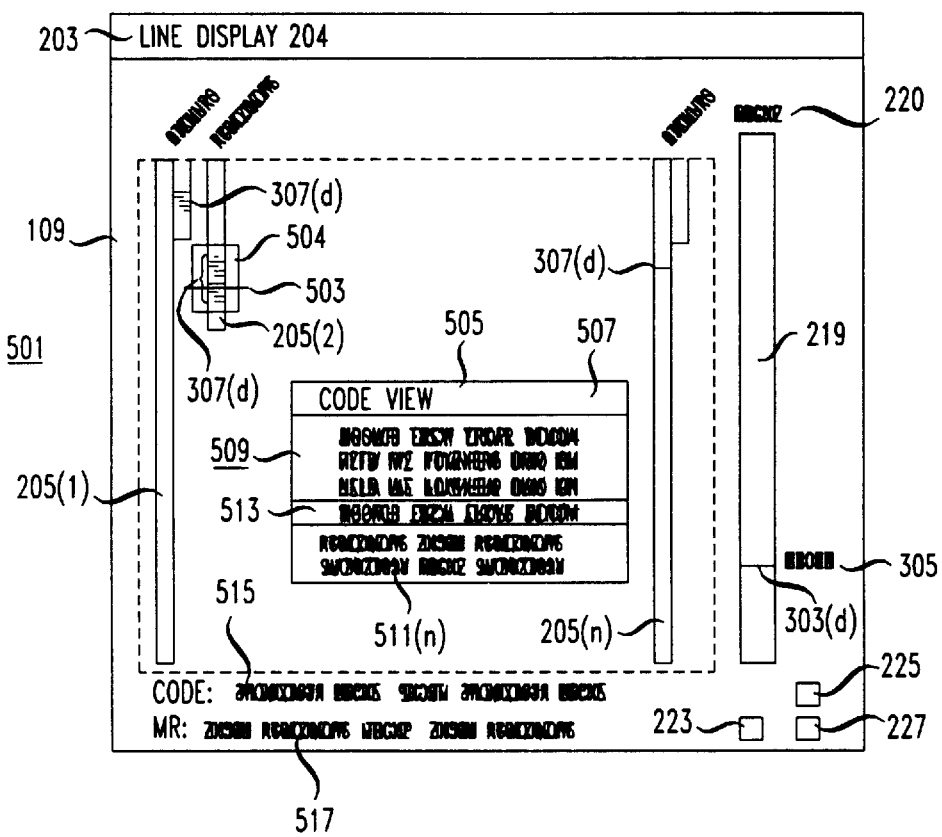
FIG. 5 is a diagram of fourth and fifth displays produced by the preferred embodiment.
Figure 6:
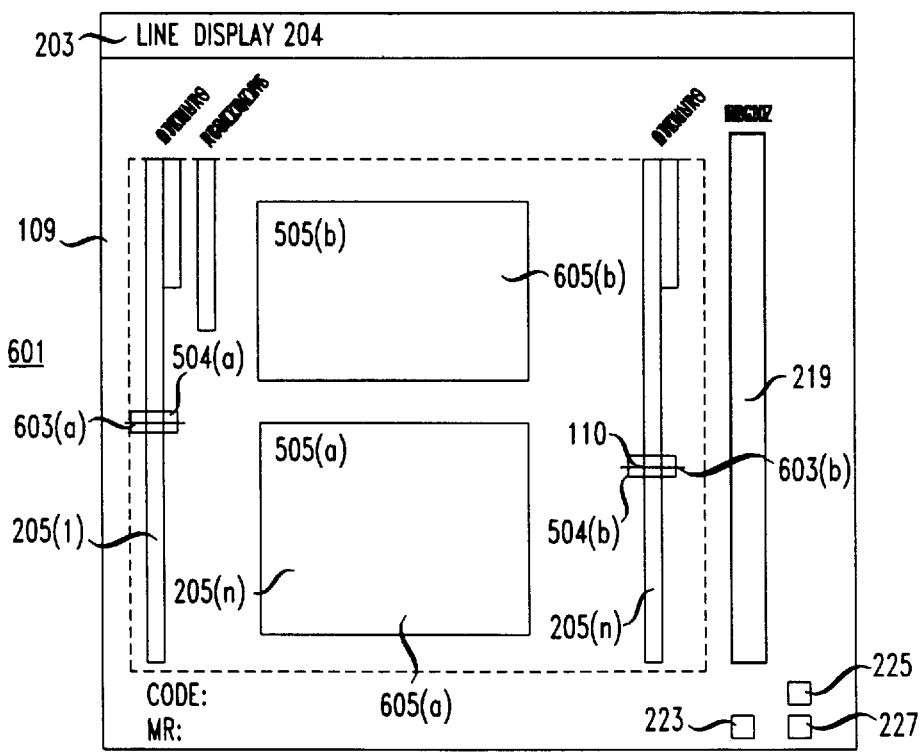
FIG. 6 is a diagram of a sixth display produced by the preferred embodiment.
Figure 13:
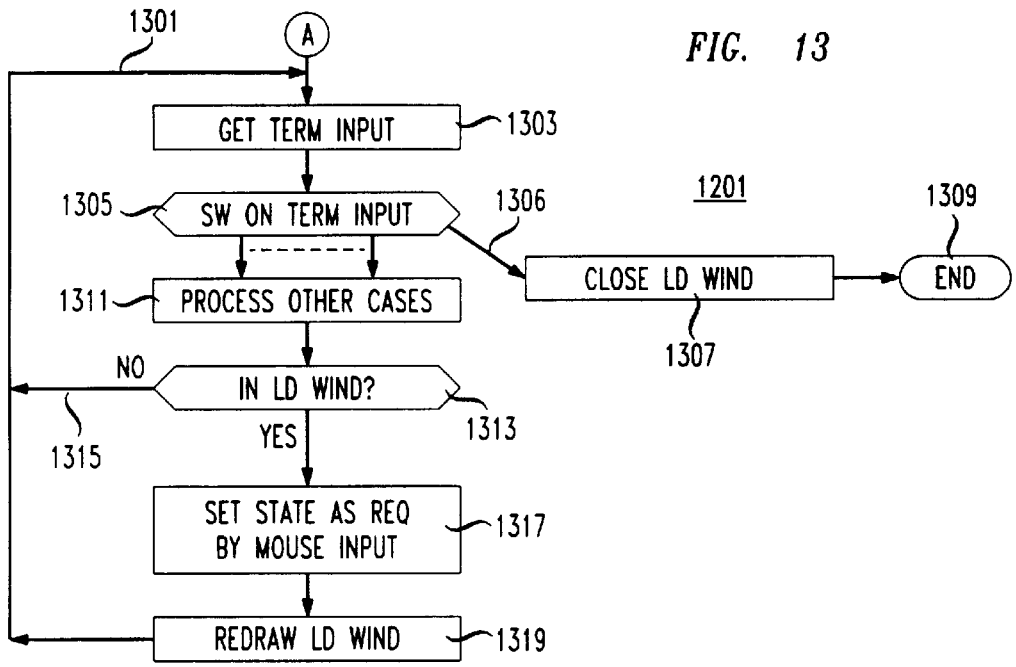
FIG. 13 is a second part of a flowchart showing operation of the preferred embodiment.
Figure 14:
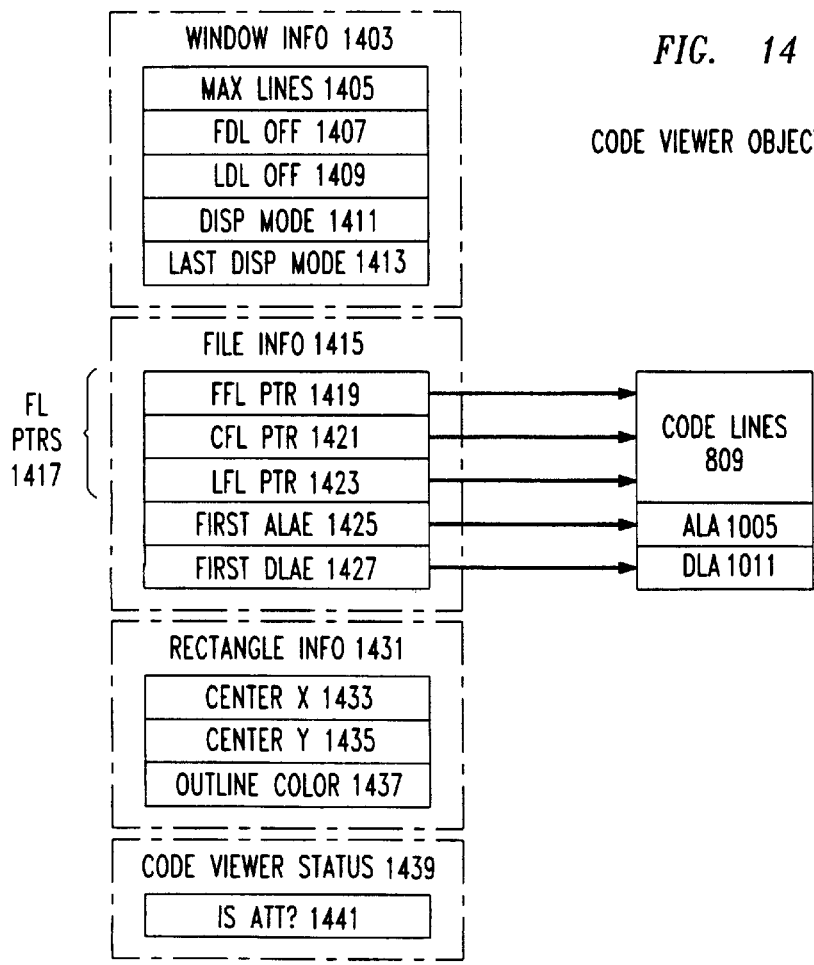
FIG. 14 is a diagram of a code viewer object.

The following Detailed Description of a preferred embodiment includes FIGS. 1–14 of the parent patent application together with the parent's Detailed Description through the section titled "Implementation of Code Viewers: FIGS. 5, 6, and 14". Thereupon, it describes a preferred embodiment of apparatus for visualizing program slices.
Environment of the Invention: FIG. 1

A preferred embodiment of the invention is employed by developers in charge of maintaining a very large body of code for a digital switch. A major problem in maintaining any large body of code is keeping track of the changes. The developers who use the preferred embodiment make changes in the code for the digital switch only in response to modification requests, or MRs. In environment 101 in which the preferred embodiment is employed, all of the changes resulting from the MRs are recorded in code body data base (CBDB) 113. In code body data base 113, there is a code file record (CFR) 115 for each file of code used in the switch. Together, these code file records 115 make up code file records (CFRS) 114. A given code file record 115($m$) includes code file name (CFN) 116, which is the name of the code file to which the record corresponds, and a pointer to a set of code file line records (CLFRS) 117. Set of records 117 includes a code file line record (CFLR) 118 for every line of code which has been added to or deleted from the code file corresponding to code file record 115($m$). A code file line record 118($m,r$) for line r of the file represented by code file record 115($m$) contains three fields:

Text field 119 contains the text of the added or deleted line;

Add MR (AMR) 120 and delete MR (DMR) 122 are pointers to records in code body data base 113 for the MRs which resulted in the addition of the line to or deletion of the line from the file. Since every line was at one time added to the body of code, every line has a pointer in AMR field 120; if the line was subsequently deleted, there is also a pointer in DMR field 122; otherwise, DMR field 122 has a null pointer value.

In CFLR 118($m,r$), add MR field 120 contains a pointer and DMR field 122 contains a null value. Hence, there is a single modification request record (MRR) 121 corresponding to the code file line represented by code file line record 118($m,r$).

There is a modification request record 121 for every modification request which has resulted in a change in the body of code. All of the modification request records 121 together make up modification request records (MRRS) 126. z Each modification request record 121 contains modification request name (MRN) 125 and pointers to other items of information. Those relevant to the present discussion include date 139, which is the date at which the modifications requested in the modification request were completed, abstract 141, which is a short description of the modification request, and developer records (DVPRS) 143 which contains developer records (DVPR) 145 for the developers who carried out the modification request.

As is apparent from FIG. 1, every code file line record 118 which was modified by a given modification request will contain a pointer to the modification request record 121 for the given modification request. A developer may thus employ code body data base 113 to determine when, why, and by whom every line in the body of code was added or deleted. All of the information in code body data base 113 is accessible by means of processing unit 111, which can use a data base system to retrieve information from code body data base 113. The retrieved information can be displayed on display 107 in response to commands input via keyboard 105 or pointing device (in this case, a mouse) 103. A current position in display 107 is indicated by cursor 110, which may be controlled either from keyboard 105 or mouse 103. If a windowing system is executing on processor 111, the information may be displayed in one or more windows 109 in display 107. For example, a programmer might employ one window 109 to display lines of code from the text fields 119 of the code file line records 118 for the relevant lines and another window to display information from modification request records 121 for the relevant lines.

While code body data base 113 contains all of the information which a programmer seeking to understand the history of the body of code needs, the usefulness of the information is severely limited by the fact that very little of it is visible at a given moment Display device 107 has a display which generally measures no more than 19 inches diagonally, and information from code body data base 113 is generally displayed in the form of ASCII characters; consequently, no more than about 200 total lines of information from code body data base 113 can be usably displayed in display device 107.

Using the Preferred Embodiment to Display Information: FIGS. 2–6

Figure 2:
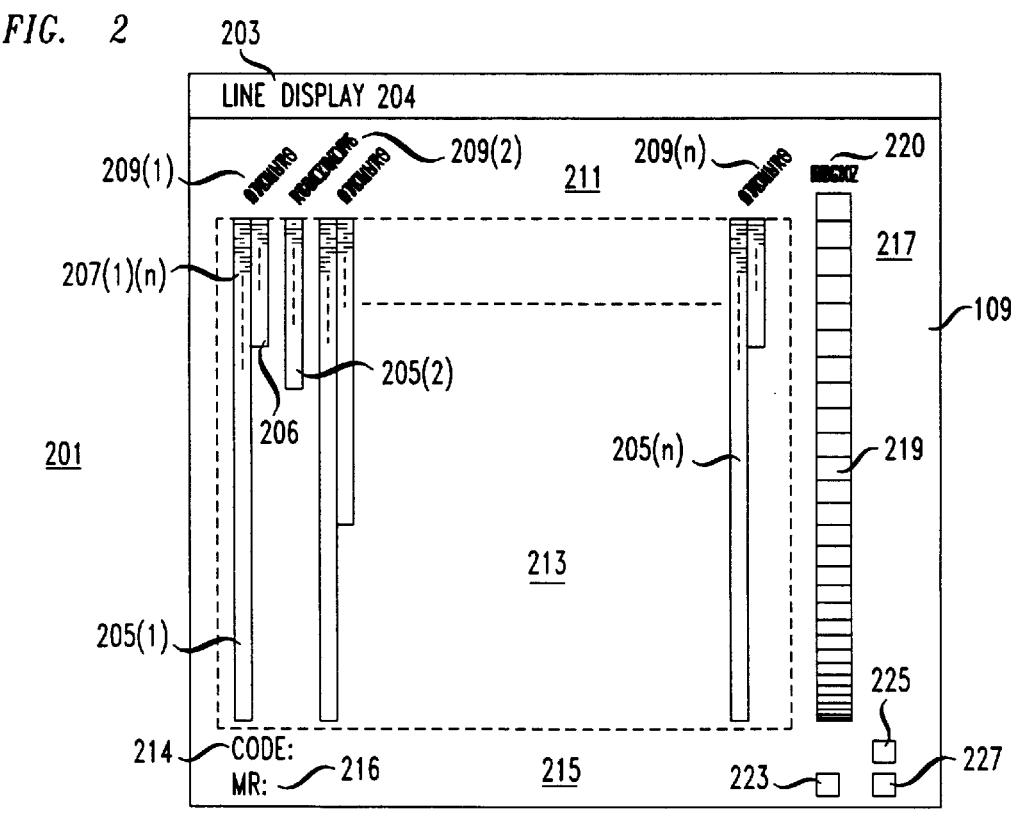
FIG. 2 is a diagram of a display produced by the preferred embodiment.

FIG. 2 shows how the preferred embodiment is employed to display information from code body data base 113. Display 201 is in a window 109 of display 107. As indicated by title 203 at the top of display 201, the display's purpose is to display information about lines of code from the code files making up the body of code. Display 201 is divided into five parts:

- Title display part 204 displays the window's title;
- display space part 213 displays file columns 205 which represent code files and which contain line representations 207 representing lines in the code file represented by the file column 205;
- top space part 211 contains the name 116 of the code file represented by each file column 205;
- right hand space part 217 displays line characterization column 219; and
- bottom space part 215 displays textual information about a selected line of code or a selected modification request and three buttons for controlling the preferred embodiment Beginning with details of display space 213, there is a column 205 for each code file in the body of code. The name 209 of the code file to which column 205 corresponds appears in top space 211 above that column 205. The name is of course taken from code file name 116 of code file record 115 corresponding to the code file. Each column 205 is automatically sized so that columns 205 for all of the code files in the body of code fit in display space 213. The minimum width of a column is 15 pixels, and the column is as long as is required to contain a line representation 207 for each code line for which a line representation is being displayed. If the number of lines in the code file results in a column 205 which is longer than display space 213, an additional column 206 for the remaining lines is placed immediately adjacent to column 205.

The developer can employ button 227 to select code lines for display. In the preferred embodiment there are three options:

- a lines added option, in which the line representations 207 in the columns 205 represent code lines which have been added to the files represented by columns 205 and have not been deleted;
- a lines deleted option, in which the line representations 207 in the columns 206 represent code lines which have been deleted from the files represented by columns 205; and
- a split column option, in which two sets of line representations are displayed side by side in the columns 205, one representing code lines which have deleted and the other representing code lines which have been added.

Whether a code line has been added or deleted can of course be determined from code body data base 113. The line representations 207 appear in the same order in column 205 as the lines appear in the code file. In the preferred embodiment, line representations 207 are a single pixel thick. As will be discussed in more detail below, the color of line representations 207 can be changed by operations on display 201.

In the preferred embodiment, the code is written using standard indentation rules, and consequently, indentations of code lines carry information about the structure of the code. To make this information available to programmers looking at display 201, the preferred embodiment provides a button 223 which selects whether a line representation 207 is to show the indentation of the corresponding code line. The programmer uses his mouse 103 to activate the button and thereby select indentation. If indentation has been selected, the pixels of line representation 207 begin at a distance from the right-hand side of column 205 which corresponds to the degree of indentation of the corresponding code line and the line representation contains a number of pixels which corresponds to the length of the corresponding code line. If indentation has not been selected, line representation 207 fills the entire width of column 205.

Bottom space 215 contains buttons 223, 225, and 227 and labels 214 and 216; the use of button 223 and button 227 have already been discussed, and the use of button 225 will be described in detail later. Label 214 indicates the where the preferred embodiment displays the text of a selected line of code and label 216 indicates the position at which the text of the abstract of a selected modification request is displayed. The manner in which the selection occurs will be described later.

Right hand space 217 contains line characterization column 219 and line characterization column label 220. Line characterization column 219 indicates how different values from modification request records 121 are to be displayed in line representations 207. For example, each code file line record 118 includes a pointer to the modification request record 121 for the modification request which added or deleted the line, and the relevant modification request record 121 in turn includes a pointer to date record 139; consequently, the time at which every line of code was added to or deleted from the code body can be determined from code body data base 113. The time at which a line of code was changed is made visible in display 201 as follows: a shade of color is assigned to each modification request. The shade depends on when the modification request was completed. In the preferred embodiment, the shades range from red through yellow to blue, with blue representing the oldest and red the most recent modification request. Further, each modification request is associated with a modification request representation consisting of a rectangle of pixels in line characterization column 219, with the rectangle for the oldest modification request at the bottom and the rectangle for the youngest at the top. The modification request representation for a given modification request is further displayed in that modification request's color, so that the color of line characterization column 219 ranges from blue at the bottom to red at the top. Finally, the line representations 207 which were added or deleted in a given modification request are displayed in the color corresponding to that time. Thus, line representations 207 which were added or deleted in the most recent modification request are red, while those which were added or deleted in the oldest modification request are blue, and the other line representations 207 have the colors corresponding to the modification requests in which they were added or deleted.

Display 201 is thus noteworthy for two reasons: first, it displays representations 207 of all of the lines in the code body at once. Second, it displays information about the displayed lines. As regards the display of representations of all of the lines in the code body, a standard display 107 with a 19 inch diagonal measurement can display 1024 pixels vertically and 1280 pixels horizontally. If display 201 is in a window 109 which occupies substantially all of display 107, line characterization column 219 takes up about one fifth of the horizontal space and top space 211 and bottom space 215 about one eighth of the vertical space, leaving a display space 213 of about 900 pixels by 1000 pixels for display of columns 205. With a minimum column width of 15 pixels and a distance of 8 pixels between columns, more than 40 columns 205 can be displayed, and each of these columns can have up to 900 line representations. Thus, a single display space 213 in a preferred embodiment can display line representations 207 for more than 36,000 individual lines of code.

As regards the display of information about the lines, in the example set forth above, display 201 provides the developer with a complete overview of the temporal development of the code body. Line representations 207 which have the same or closely-related shades represent code lines which were modified at approximately the same time. The developer can thus see the major stages of development of the code body from the colors which appear in the line representations 207 in the columns 205. Further, the developer can determine whether a portion of the body of code has remained stable over time or whether it has been constantly reworked. In the first case, most of the line representations 207 will have the same color; in the second, they will have many different colors. Finally, the developer can easily see how changes made in one code file relate to changes made in other code files, and can thereby see dependencies between code files.

Figure 3:
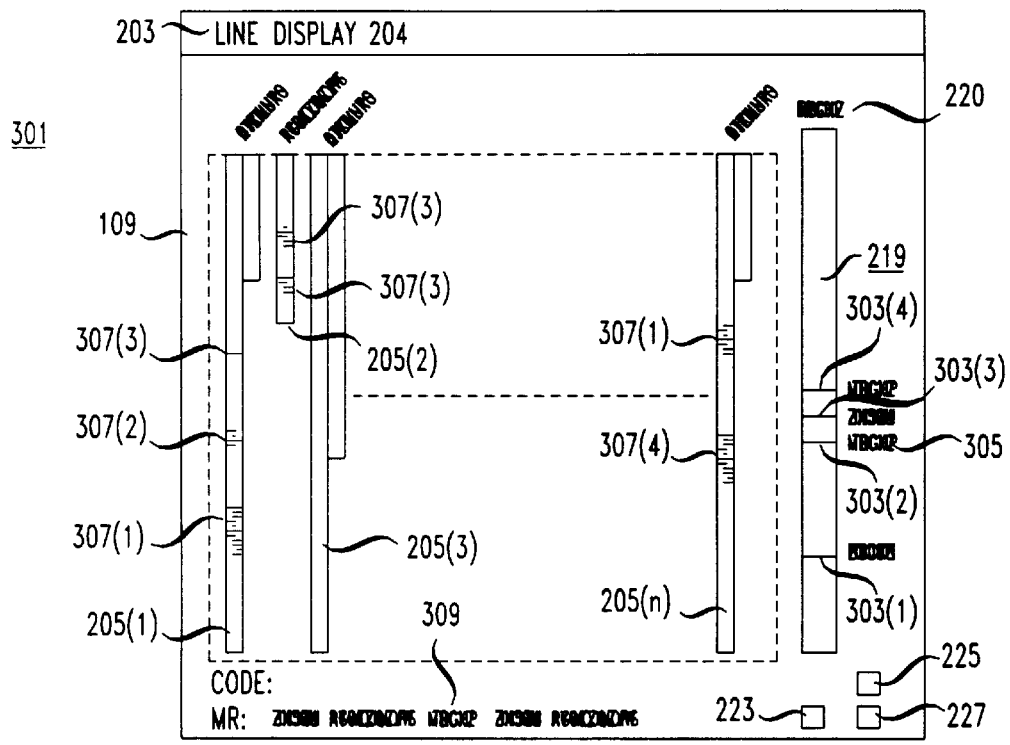
FIG. 3 is a diagram of a second display produced by the preferred embodiment.

Operations on Display 201: FIGS. 3–5

Display 201 shows how a preferred embodiment presents an overall view of information from code body data base 113 about the code body. Using mouse 103, a user of the preferred embodiment may perform operations on display 201 to obtain more detailed information about the code body.

There are four general classes of mouse operations which may be performed on display 201: moving the cursor, selecting an entity at the current location of the cursor, deselecting the entity at the current location of the cursor, and moving a window. To move the cursor, the developer simply moves mouse 103. If no buttons are being pressed, when cursor 110 passes over a line representation 207 or a modification request representation which is turned off (has the color black in a preferred embodiment), the line representation 207 or the modification request representation is turned on (is given the color associated with the relevant modification request) while the cursor 110 is over the line representation or modification request representation. The modification request representation for a given modification request and the line representations 207 for the code lines modified in the given modification request are coupled together so that if the cursor 110 is on the given modification request or on any line representation 207 for any line of code affected by the given modification request, the modification request representation for the given modification request and all of the line representations for the lines affected by the given modification request are turned on.

If the leftmost mouse button being pushed, the line representation or modification request representation under the cursor is turned on and left on after the cursor moves on; the modification request representation and the line representations 207 for the affected lines are coupled as previously described. If the middle mouse button is being pushed, the line representation or modification request representation under the cursor is turned off and left off after the cursor moves; again, the modification request and its corresponding line representations are coupled. If both the left-hand and middle buttons are pushed, the mouse 103 can be used to move components of display 201 about. The use of the right-hand mouse button will be discussed further on.

All of the line representations 207 and modification request representations can be turned on or off by means of label 220 for line characterization column 219. If mouse 103 is moved to label 220 and the leftmost button is pushed, all of the line representations 207 and modification request representations are turned on and left on; if the middle button is pushed, all of the line representations 207 and modification request representations are turned off and left off until the cursor passes over the line representation or modification request representation. In the following, a modification request is described as being active if its modification request and the line representations 207 coupled with the modification request are turned on and left on.

FIG. 3 shows how a developer may employ mouse 103 to obtain more information about one or more modification requests. Display 301 results when all of the line representations 207 and modification request representations have been turned off as just described. As mouse 103 moves cursor 110 across the window, the line representations 207 and their coupled modification request representations over which the cursor passes are turned on; if the leftmost button is depressed at that point, the modification request corresponding to the modification request representation has been activated and the modification request representation and its coupled line representations 207 stay on. Thus, FIG. 3 shows the result after the developer has depressed the leftmost mouse button over modification request representation 303 (1), 303(2), 303(3), and 303(4). The line representations 207 coupled with those modification request representations appear respectively as sets of line representations 307(1), 307(2), 307(3), and 307(4) respectively. When a modification request representation 303 is activated as just described, a label 305 appears to the right of the modification request representation 303. The text of label 305 comes from name record 125 of the modification request record 121 for the modification request Further, the text 309 of the abstract of the modification request appears following label 216 in bottom field 215. The text comes of course from abstract record 141.

A developer may deactivate a modification request in the preferred embodiment by placing the cursor over modification request representation 303 corresponding to the modification request and pressing the middle button. When the button is pressed, modification request representation 303 is and its coupled line representations are turned off, as are label 305 and abstract text 309. Labels 305 and abstract text 309 do not appear when all modification requests are activated by using mouse 103 to select line characterization column label 220.

Another operation on display 201 is the code file selection operation shown in FIG. 4. Again, code file selection operations are generally performed after columns 205 and line characterization column 219 have been turned off. In the code file selection operation, a code file is selected using mouse 103 to select column label 209 for column 205 representing the code file. In FIG. 4, the selected code file 403 is taken to be that represented by column 205(*n*). When column label 209(*n*) is selected, all of the modification requests which affected the given file are activated. Consequently, the line representations 207 in column 205 (*n*), all of the modification requests 303 coupled to those line representations, and all of the other line representations 207 in the other columns 205(1)–205(*n*-1) coupled to the turned on modification requests 303 are turned on. Again, labels 305 and text 309 do not appear.

in FIG. 4, the code file 403 represented by file column 205(*n*) is the result of three modification requests, and thus three modification request representations, 303(*a*), 303(*b*) and 303(*c*). The code lines 207 which were modified in the three modification requests appear in columns 205(*n*), 205(1), and 205(2) as lines 307(*a*), 307(*b*), and 307(*c*) respectively. Since a file generally includes many lines and is the result of at least several modification requests, the file selection operation does not display text following code label 214 and MR label 216, but may display labels 305, for MR representations 303(*a*)–303(*b*). Deselection of column label 209 for a selected column 403 turns off the display of the line representations 307(*a*), (*b*), and (*c*) in all of the columns 205 and the display of the modification request representations 303(*a*), (*b*), and (*c*) in Line characterization column 219. As can be seen from the foregoing, the file selection operation permits the user to instantly see what modification requests have affected the selected file and how these modification requests have affected the other files of the code body.

Another operation possible on display 201 is line selection. When cursor 110 is moved onto a given line representation 207 and the line representation is selected by pressing the leftmost mouse button, the pixels in line representation 207 remain turned on when cursor 110 moves on. Of course the coupled modification request representation 303 and the other line representations 207 coupled to that modification request representation 303 also remain turned on and label 305 appears with the modification request representation 303. Thus, in FIG. 5, display 501 shows selected line representation 503, which was modified in the modification request corresponding to modification request representation 303(*d*). Line representation 503 is part of one of the sets of line representations 307(*d*) which were modified in the modification request corresponding to modification request representation 303(*d*), and the pixels in those line representations are also turned on. The selected line itself appears following the label "Code" in bottom space 215, and the abstract for the modification request corresponding to modification request representation 303(*d*) appears following the label "MR" in bottom space 215. In FIG. 5, the line of code has the reference number 515, and the abstract has the reference number 517. As may be inferred from the foregoing discussions, the general principal for the appearance of an abstract at 517 and a line of code at 515 is that the current operation on display 201 only specify a single modification request and/or a single line of code. Line deselection is done by moving the cursor across a line representation 207 while the middle button is depressed, and the result is the reverse of the result of line selection.

FIG. 5 also illustrates code view window 505. Code view window 505 displays lines of code preceding and following the line of code represented by line representation 207 at which cursor 110 is presently located. To open code view window 505, the developer using the preferred embodiment employs mouse 103 to select code window button 227. The window then opens, and the developer can use mouse 103 to size the window or change its location. After the developer has opened and sized code view window 505, he may move cursor 110 to a column 205; at that point, a rectangle 504 appears at the position of the cursor in column 205. The rectangle has a horizontal line across its center and has a size which is proportional to that of window 505, i.e., rectangle 504 has space for as many line representations 207 as window 109 has for lines of code. As long as cursor 110 is in a column 205, cursor 110 is at the center of rectangle 504 and rectangle 504 moves with cursor 110. The code lines corresponding to any line representations 207 which are within rectangle 504 appear in window 505.

Rectangle 504 may be detached from cursor 110 by pushing the rightmost button of mouse 103. When that is done, rectangle 504 remains where it was when the rightmost button was pushed and window 505 continues to display the lines of code corresponding to the line representations contained within rectangle 504. Rectangle 504 may be reattached to cursor 110 by again pushing the rightmost button, at which point rectangle 504 moves to where cursor 110 is. Code window 505 is closed by using the standard closing operation for the windowing system.

If columns 205 are split, i.e., display line representations 207 for both added and deleted lines, window 505 is also split, with the added and deleted lines of code being displayed alongside each other. The colors of displayed lines of code 511 are the same as those of the corresponding line representations 207 within rectangle 504. If the corresponding line representation 207 is not turned on, the displayed line is gray. At the center of code display space 509 is displayed line of code 513, which is the line of code corresponding to the line representation 207 at the location of the horizontal line in rectangle 504. In a preferred embodiment, displayed line of code 513 has a different colored background from lines 511. As would be expected, the line of code 515 is the same as line 513 and abstract 517 is that for the modification request corresponding to displayed line of code 513. In a preferred embodiment, the code lines visible in code window 505 can be changed only by moving rectangle 504; in other embodiments, the code lines may be moved by scrolling up or down within window 505 and rectangle 504 may move in column 205 as lines are scrolled within window 505.

In a preferred embodiment, there may be up to three code windows 505. By using multiple code windows 505, a developer can compare the code in one portion of the code body with the code in another portion of the code body. FIG. 6 shows a display 601 with two code windows 505(*a*) and 505(*b*). Presuming that code window 505(*a*) already exists and that rectangle 504(*a*) has been detached from cursor 103, a new code window 505(*b*) is made by moving cursor 110 to code window button 227 and selecting the button. As a result, window 505(*b*) is opened and rectangle 504(*b*) appears and is attached to cursor 110. Window 505(*b*) can be moved and sized as previously described, and since rectangle 504(*b*) is now attached to cursor 110, movements of cursor 110 are reflected in window 505(*b*).

Rectangle 504(*b*) can of course be detached from cursor 110 as described above. If there is more than one rectangle 504 in display 201 and cursor 110 is attached to none of them, depressing the rightmost button of mouse 103 causes cursor 110 to move to the closest rectangle 504 and causes that rectangle 504 to attach itself to cursor 110. In the preferred embodiment, the border 603 of a rectangle 504 has the same color as the border 605 of the window 505 to which the cursor corresponds, making it easy for the developer to determine which rectangle 504 corresponds to which window 505. As will be apparent to those skilled in the graphic display arts, the techniques which have been just described with regard to code windows 505 and rectangles 504 may be employed in any situation in which a "zoom" window is used to show details about a portion of a display.

The operations on display 201 thus permit a developer to easily and quickly determine what lines of code in the body of code were affected by one or more modification requests, to determine which modification requests are relevant to a given file of code or to a given line in a given file of code, and to display a given line of code and the lines of code in the given line's immediate environment. All of these operations are of course made more useful by the fact that they are performed in the context of the overview of the entire body of code which is provided by display 201. Other aspects of display 201 which are not shown in FIGS. 2–6 but are worthy of mention are the following: in some embodiments, there is a line number scale along the left-hand side of display space 214 and a scale along the left-hand side of line characterization column 219 which indicates degrees of the values associated with the shades of color in line characterization column 219. For instance, in display 201, the shades are associated with dates, and the scale is a date scale.

Implementation of a Preferred Embodiment: FIGS. 7–13

The following discussion of an implementation of a preferred embodiment first describes the hardware in which the invention is implemented, then describes the data structures, and finally describes operation of the preferred embodiment.

Figure 7:
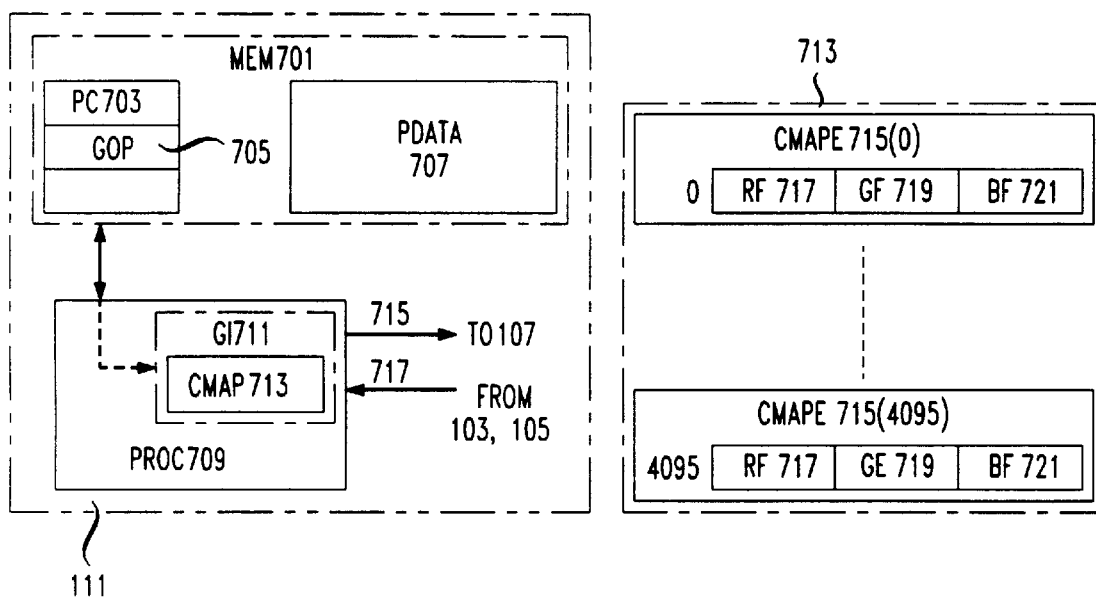
FIG. 7 is an overview of the hardware employed in the preferred embodiment.

Hardware employed In a Preferred Embodiment: FIG. 7

A preferred embodiment of the invention is implemented using a Silicon Graphics 4D/35 processor running the Personal IRIS operating system. FIG. 7 is a block diagram of processing unit 111 employing the Silicon Graphics 4D/35 processor. Processing unit 111 has two main components: memory (MEM) 701 and processor (PROC) 709. Stored in memory are program code 703, which is a program employed to implement the preferred embodiment, and program data (PDATA) 707, which is data employed in the implementation. Under control of program code 703, processing unit 709 uses program data 707 to create the displays which have just been described on display 107.

Processing unit 111 is specially designed to produce graphics displays. Included in processing unit 111 is graphics interface 711, which controls display 107 and responds to inputs from keyboard 105 and mouse 103. Graphics interface 711 is controlled by graphics operations 705 in program code 703. The graphics interface is described in detail in *Graphics Library Reference Manual, C Edition*, Document Number: 007-1203-040, Silicon Graphics Computer Systems, 1991. As already mentioned, the displays of the preferred embodiment employ colors; the colors used in the display are defined by color map 713 in graphics interface 711. As shown in detail in the lower part of FIG. 7, color map 713 has 4096 color map entries (CMAPE) 715. Individual color map entries 715 are indexed by values ranging from 0 through 4095. Each color map entry contains three fields, a red field 717, a green field 719, and a blue field 721. The values in these fields determine the intensity of a red color component, a green color component, and a blue color component, and thus define a color. For example, for the color black, all three fields have the value 0.

Three of the graphics operations 705 manipulate color map 713:

color (<color map index>) specifies a color by specifying an index of a color map entry 715. The next pixels written in display 107 will be written in the color defined by the specified color map entry 715.

mapcolor(<color map index>, <red value>, <green value>, <blue value>) sets the fields in color map entry 715 specified by the index value to the values specified in the remaining arguments.

getmcolor(<color map index>, <red loc>, <green loc>, <blue loc>) writes the present values of the fields of the color map entry 715 specified by the index value to the locations in memory 701 specified by the remaining arguments.

Color map 713 can thus be used to create a "palette" of colors for use in display 107 and then to employ the colors in display 107. Further, the current contents of color map 713 can be saved in memory 701 for later reuse.

Figure 8:
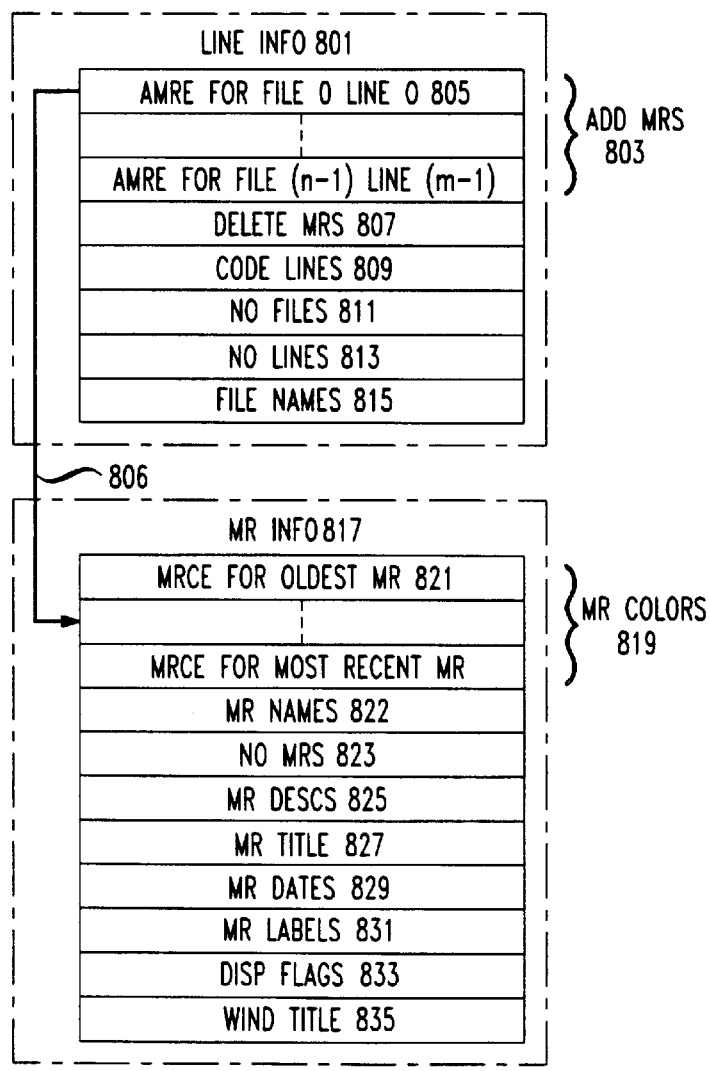
FIG. 8 is an overview of data used in the preferred embodiment.

Line and MR Data: FIG. 8

To provide for speed of operation of the preferred embodiment, the data from code body data base 113 which is the basis of the displays is copied from code body data base 113 to memory 701, where it forms part of program data 707. The copying is performed as part of a preprocessing operation which will be described in detail later. FIG. 8, shows the form of the data in memory 707. The data falls into two groups: line information 801, which is information concerning the lines of code in the code body, and modification request (MR) information 817, which is information concerning the modification requests corresponding to the lines of code.

The preprocessing operation sorts both the files in the code body and the modification requests. In a preferred embodiment, the files are sorted by file name; the modification requests are sorted by the values with which the colors are associated; in the present example, those values are the values of date record 139. In other embodiments, the modification requests may be sorted by other values, for example, by developer names from developers 143.

Beginning with line information 801, the first piece of information relates added lines of code to the modification requests which added the lines. Add modification requests 803 is an array which has one entry for every code file line record 118 whose AMR field 120 indicates that the line has been added. The entries for each file are in the order in which they occur on the file and the sets of entries for the files are arranged in the order in which the files were sorted. Each add modification request entry (AMRE) 805 contains a pointer to a location in modification request information 817 which specifies the color which is associated with the modification request which added the line.

Delete modification requests 807 is an array like add modification requests 803, except that it contains entries for each deleted line. Again, each entry has a pointer to a location in modification request information 817 which specifies the color which is associated with the modification request which deleted the line. Code lines 809 is the text of the lines of code in the body of code. The lines are arranged in the order in which they occur in the files and the files are arranged in the sorted order. Number of files 811 is an integer which specifies the number of files, and number of lines 813 is an array of integers which specifies the number of lines in each file. The integers for the files are arranged in the order into which the files were sorted. File names 815 is an array of the names of the files, again arranged in the order into which the files were sorted.

Continuing with modification request information 817, the first part of that data is an array specifying the colors associated with the modification requests. Modification request colors 819 contains a modification request color entry (MCRE) for each modification request which affected the body of code. The entry for a given modification request appears in a location in the array which corresponds to the location of the modification request in the sorted list of modification requests, i.e., in this case, the first entry 821 is for the oldest modification request, and the last entry 821 is for the youngest modification request. As part of the preprocessing, color map 713 was set up so that there was a set of color map entries 715 corresponding to the modification requests.

In that set, the colors were arranged so that the entry 715 corresponding to the oldest modification request was given the color blue, the entry 715 corresponding to the youngest the color red, and the others the colors in between. Each entry 821 contains the index in color map 713 of the color which corresponds to the modification request represented by the entry 821.

MR Names 822 is an array of the names of the modification requests. The information comes from modification request name field 125. Again, the names are in the order in which the modification requests were sorted. Field 823 specifies the number of modification requests; modification request descriptions 825 is an array which contains the abstracts 141. MR title 827 is the title which appears above line characterization column 219; it is provided as a parameter during preprocessing. MR dates 829 is an array of the dates, as specified in date field 139; again, the oldest date is the first element and the youngest the last. MR labels 829 are data used to label the MRs in line characterization column 219. The labels are in the order into which the modification requests were sorted. Display flags 833 are flags which indicate the appearance of display 201 before any input from the developer, for example, whether the split display is used at that point. Window title 835, finally, is title 203 of window 109. Both the flags and the title are provided as parameters.

The effect of the production of line information 801 and modification request information 817 from code body data base 113 is that all of the information which would result from certain queries to code data base 113 is contained in line information 801 and modification request 817 and is immediately available to the preferred embodiment. The preferred embodiment can thus provide substantially instantaneous displays of the results of those queries.

Figure 9:
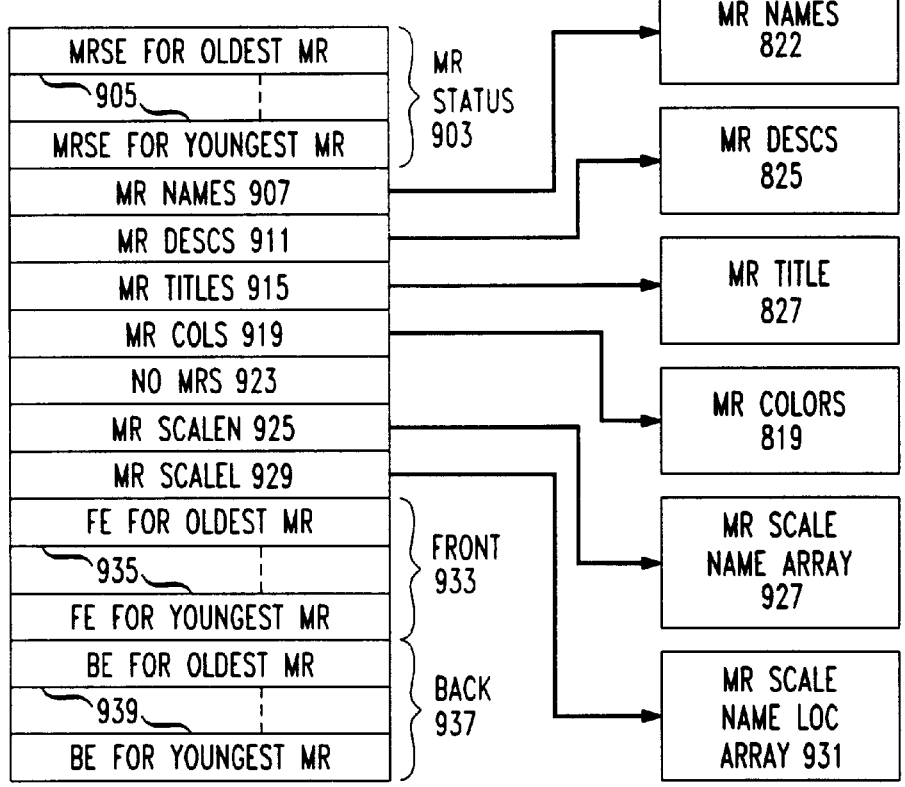
FIG. 9 is a diagram of the MR object employed in the preferred embodiment.
Figure 10:
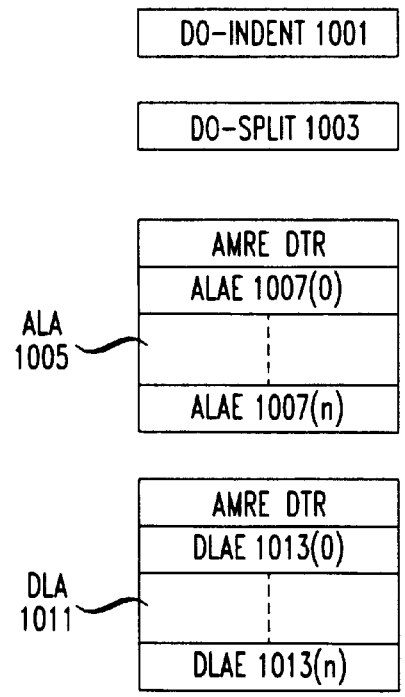
FIG. 10 is a diagram of other data used in the preferred embodiment.
Figure 11:
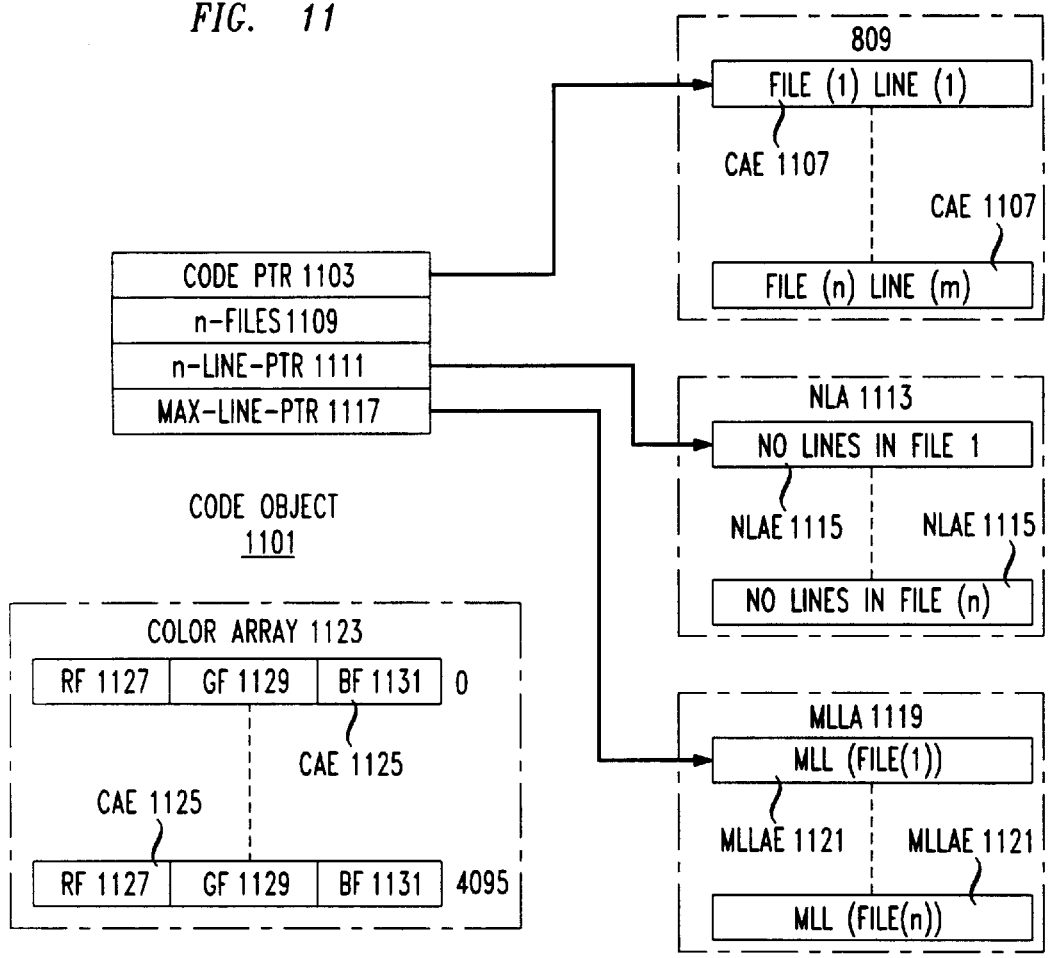
FIG. 11 is a diagram of a code object and other data used in the preferred embodiment.

Objects Employed in the Preferred Embodiment: FIGS. 9–11

The source code for program code 703 for the preferred embodiment is written using the C++ programming language, described in Bjarne Stroustrup, *The C++ Programming Language,* Addison-Wesley, Reading, Mass., 1987. C++ is an object-oriented language, and consequently, objects are employed in the source code to represent the modification requests and the code.

FIG. 9 shows data structures employed in modification request object 901, which represents the modification request. The first data structure is modification request status array 903. There is a modification request status entry (MRSE) 905 in array 903 for each modification request, and the entries are arranged in order from oldest to youngest. Each entry may have one of four status values: neither marked nor active, marked, active, and both marked and active. The "marked" status indicates that the modification request's label 305 is to be displayed; the "active" status indicates that the modification request is active.

Fields 907 through 919 are pointers to parts of MR INFO 817. MR NAMES 907 points to MR NAMES 822; MR DESCS 911 points to MR DESCS 825; MR TITLE 915 points to MR TITLE 827; MR COLS 919 points to MR COLORS 819. Field 923 indicates the number of modification requests; MR SCALEN 925 points to an array which contains the scale labels for line characterization column 219; MR SCALEL 929 points to an array which contains the locations for the labels.

The arrays FRONT 933 and BACK 937 are Boolean arrays. There is one element in each array for each modification request, and the value of the element indicates whether the modification request representation 303 and the line representations 205 coupled thereto are to be displayed on display 201 in black or in the color associated with the modification request. There are two arrays so that display 201 can be redrawn from FRONT while BACK 937 is being modified to incorporate the changes resulting from the movement of cursor 110 and the positions of the buttons on mouse 103.

FIG. 11 shows data structures belonging to code object 1101, which represents the code of the body of code. Code pointer 1103 points to code lines 809 in line info 801; as shown in FIG. 11, the lines are organized in order for each file, with the files in the sorted order. Number of files (n-FILES) 1109 indicates the number of files with code in code lines 809. Number of lines pointer 111 points to a number of lines (NLA) array 1113, which contains a number of lines array entry (NLAE) 1115 for each of the files in 809 which indicates the number of lines in that file. The order of the entries is again the sorted order of the files. Maximum line pointer 1117, finally points to maximum line length array (MLLA) 1119, which has a maximum line length array entry (MLLAE) 1121 for each file. The entry for a file indicates the length of the longest line in the file. The line length information is used to properly size line representations 207.

FIG. 11 also shows color array 1123, which is an array in memory 701 which is parallel to color map 713 and which retains the relationship between modification requests and colors originally set up in color map 713. There is a color array entry (CAE) 1125 in color array 1123 corresponding to each color map entry 715, and like a color map entry 715, color array entry 1125 specifies a color by means of values in a red field 1127, a green field 1129, and a blue field 1131.

FIG. 10 shows other relevant data structures employed in the preferred embodiment. The variable "do_indent" indicates by its value whether line representations 207 are to show indentations. The value is set when cursor 1110 is moved over button 223 and the left mouse button is pushed. The variable "do split" indicates by its value whether line representations for the added lines, the deleted lines, or both are to be displayed. Its value is set when cursor 1110 is moved over button 227. Both may also be set from values in display flags 833 at the beginning of execution of program code 703. Added line array (ALA) 1005 is an array of pointers to entries 805 in add modification request array 803; each of the entries 805 in turn points to an entry in MR Colors 819. Similarly, deleted line array (DLA) 1011 is an array of pointers to entries in delete modification requests 807. These structures thus serve to link lines of code to the relevant modification requests.

Figure 12:
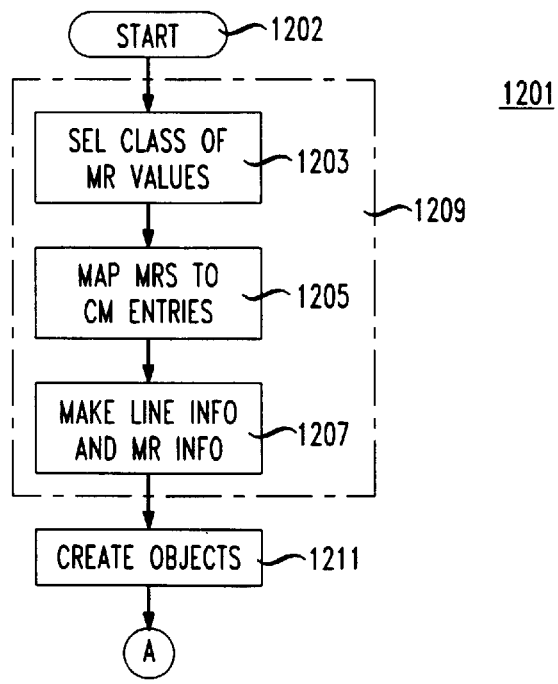
FIG. 12 is a first part of a flowchart showing operation of the preferred embodiment.

Operation of the Preferred Embodiment: FIGS. 12 and 13

FIGS. 12 and 13 together contain flowchart 1201, which presents a high-level view of the operation of the preferred embodiment. Beginning with FIG. 12, the first part of the operation of the preferred embodiment is preprocessing step 1209, which prepares line info 801 and MR info 817 from data in code body data base 113. The first step in the preprocessing is step 1203. In step 1203, a class of values is selected for association with colors in color map 713. In the example outlined above, the selected class of values was the date on which each of the modification requests was completed; however, it is equally possible to select other classes of values. For example, if it is desired to see which code was written by which developers, the sets of developers specified in developer records 103 can be selected as the class of values and a different color can be associated with each set of developers. In the preferred embodiment, selection of the class of MR values is done in response to a parameter provided to the program which does the preprocessing.

The next step, step 1205, maps the modification requests to entries 715 in color map 713. In the preferred embodiment, this is done by sorting the values of the selected class of MR values, mapping the sorted values onto entries 715, and then associating each modification request With the color onto which the selected value for that modification request was mapped. In the date example, the dates were sorted from earliest to latest, and were mapped in that order on color map entries 715 representing colors ranging from blue through green, yellow, and orange to red. Each modification request has a date, and the color onto which the modification request's date is mapped becomes the modification request's color. The results of the mapping of the selected values to the colors and of the association of the colors with the modification requests are recorded in MR colors 819, where each entry 821 for a MR contains the index of color map entry 714 for the color associated with date 139 for the given modification request.

The last step, step 1207, in preprocessing step 1209 makes line info 801 and MR info 817. As previously indicated, most of the information in these data structures comes from code body data base 113. Information about lines of code and the lines themselves are ordered by sorting the file names and putting the lines in the files in the order of the sorted file names; information about MRs are ordered by the sorted order of the values which were mapped onto color map 713. The values of display flags 813, MR title 827, and window title 835 are provided by parameters to the preprocessing program.

MR Info 817 and line info 801 are arguments to the program which actually produces and manipulates display 201. The first step in that program, step 1211, creates the object, including window 109 and then initialize data in the objects using values from the arguments. Among the operations performed at this point is copying the current values of color map entries 715 into the corresponding entries of color array 1123.

Once these initializations are done, main loop 1301 (FIG. 13) can begin executing. The first step in main loop 1301, step 1303, gets the value at the head of a queue of inputs from keyboard 105 and mouse 103. That value determines what happens in step 1305 if it indicates that the line display window in which display 201 appears is to be closed (branch 1306), the actions necessary to close the window are taken and the program which implements the preferred embodiment terminates, as shown in steps 1307 and 1309.

Otherwise, the other cases are processed in step 1311; no matter what case is processed, the next step is step 1313: if cursor 110 is in the line display window, the next step is step 1317; otherwise it is step 1303. In step 1317, program state is set as required by the mouse input. Some examples are the following:

If the mouse is in display space 213, the following occurs in step S1317:

If the cursor has passed over a line representation 207 or a modification request representation 303, entry 93.5 in FRONT array 933 for the modification request which modified the line represented by the line representation or which is represented by the modification request representation is set to TRUE.

If the leftmost button was down when the cursor passed over the line representation 207 or modification request representation 303, MR status entry 905 for the modification request is set to "both marked and active".

If the center button was down when the cursor passed over the line representation 207 or modification request representation 303, MR status entry 905 for the modification request is set to "neither marked nor active" and the entry in FRONT array 933 for the modification request is set to FALSE.

If the cursor is in top space 211, the following occurs in step 1317, if the cursor 110 is on a file name 209, state is set so that the name will be white if the left button was pushed, red if the center button was pushed, and otherwise yellow. Then a loop is executed which does the following for each line in the file identified by the label: depending on whether the display is showing added lines, deleted lines, or both, it uses added line array 1005 and/or deleted line array 1011 to locate the entry in MR colors 819 which contains the index in color map 713 for the modification request associated with the added or deleted line. The entry in BACK 937 for that modification request is set to TRUE; if the left button is down, the state in that MR status entry 905 is set to active (or both active and marked if it was already set to marked). If the right button is down, the entry in BACK 937 for that modification request is set to FALSE and the state in that MR status entry 905 is set to neither marked nor active.

If the cursor 110 is in right space 217, what happens in step 1317 depends on whether the cursor 110 on line characterization column label 220 or in column 219. In the first case, state is set to change label 220's color as described for the file names 209; then, if either the left or middle button is down, for each modification request, entry 905 for the modification request in MR status array 903 is examined to determine whether its status is "marked" or "marked and active" and the status saved; next, the entry for the MR in MR status array 903 is set as required by the mouse buttons: if the left button is down, the status becomes active and the entry for the MR in BACK 937 is set to TRUE; if the center button is down, the status becomes neither marked nor active and the entry for the MR in BACK 937 is set to FALSE. Then, if the saved status of the MR is not "marked" or "marked and active", the current status of the MR is set to "active" only. The effect of this is to ensure that only those labels 305 for modification request representations 303 which were on prior to selection of column label 220 remain on when all of the modification request representations are activated.

If the cursor 110 is in line characterization column 219, the position of cursor 110 is converted into the number of the modification request represented by the modification request representation at the cursor 110. The conversion is possible because the modification request representations 309 have the same order in column 219 as the modification requests have in modification request colors 819. The entries in modification request status array 903 and BACK array 937 for the modification request are then set as follows:

Whether or not any button is down, the BACK array entry is set to TRUE;

if the leftmost button is down, the status array entry is further set to the value "marked and active";

if the center button is down, the BACK array entry value is reset to FALSE and the status array entry is set to the value "neither marked nor active".

An important effect of setting state as described in the foregoing discussions of the actions taken when cursor 110 is in display space 213, top space 211, or right space 217 is that the BACK array entry 939 for each modification request which was "turned on" by cursor 110 when cursor 110 passed over the modification request representation 303 for the modification request or the line representation 207 of a line affected by the modification request is set to TRUE. Further, if the leftmost or center mouse button was depressed, the MR status entry 905 for the modification request was set as required by the button, and in the case of the center mouse button, the BACK array entry 939 was set to FALSE. It is thus possible by examining BACK array 937 to determine which line representations 207 and modification request representations 303 are to be turned on as a result of the movement of cursor 110 and by examining MR status array 903 to determine which line representations 207 and modification request representations 303 are to remain on because they were selected by means of the leftmost mouse button.

Bottom space 223, finally, contains only buttons 223, 225, and 227. In the case of indent button 223 and code display type button 227, selection or deselection of the buttons changes the state of the static variables do_indent and do_split; the effect of the code view button 225 will be described in more detail later.

The final portion of step 1317 in setting up the state is setting up color map 713 so that the color map entries 715 corresponding to the modification requests whose modification request representations 303 and associated line representations 207 are to be turned on are set to the color associated with the modification request and the color map entries 715 corresponding to the modification requests whose modification request representations 303 and associated line representations 207 are not to be turned on are set to black. Color map 713 is set up by performing a loop which for each modification request first compares BACK array entry 939 for the modification request with the FRONT array entry 935 for the modification request; if they are different, indicating that a modification request has been turned on or off, the index of that modification request's color map entry 715 is saved. Then, if the BACK array entry 939 for the modification request is TRUE, the "mapcolor" function is used to set the modification request's color map entry 715 to the values in the modification request's color array entry 1125; otherwise, "mapcolor" sets the modification request's color map entry 715 to black; thereupon, BACK array entry 939 is copied to FRONT array entry 935. This last step of course ensures that FRONT array 933 always contains the immediately previous state of BACK array 937. Finally, label 214 and any code line 515 being displayed and label 216 and any modification request abstract 517 being displayed are drawn in bottom space 215.

Returning to flow chart 1201, In the next step 1319, display 201 is redrawn in accordance with the state that was set in step 1317 or in earlier iterations of loop 1301. In a preferred embodiment, only those parts of display 201 which have changed as a result of the mouse input are redrawn. For example, if the input concerns only display space 213, only that space is redrawn. Redrawing is done by copying the current display buffer into an empty buffer, redrawing those parts of the empty buffer which have changed, and then swapping the buffer with the redrawn display with the buffer from which display 201 is currently being displayed.

Redrawing of the various spaces is as follows: if display space 213 needs to be redrawn, a loop is executed in which column 205 for each file in the body is drawn. The column is drawn by means of the following loop: for each line of the file, the line stored in code lines 809 is first examined to determine its length and the number of leading blank spaces; then, if the variable do_indent 1001 indicates that indent button 223 was pushed, the length and starting point of line representation 203 is set accordingly; otherwise line representation 203 is the width of column 205.

Next, the line representation is drawn using the index into color map 713 specified for the line's modification request in added line array 1005, deleted line array 1011, or both, depending on whether display 201 is showing added lines, deleted lines, or both. As indicated above, if line representations 207 for the selected line modification request are to be turned on, the modification request's entry in color map 713 is set to the color specified for the modification request in color array 1123; if the line representations are to be turned off, the modification request's entry 715 is set to black.

Continuing with top space 211, top space 211 is redrawn by a loop which writes each file's file name 209 above column 205 for the file. The drawing of bottom space 215 adds the current state of buttons 223, 225, and 227 to labels 214 and 216 and code and abstract lines 515 and 517.

Right space 217 is redrawn as follows: line characterization column 219 is drawn by a loop which is executed for each modification request. The loop obtains the modification request's index in color map 713 from MR colors 819, uses the color function to set the color to be written to that color, and then draws modification request representation 303; consequently, modification request representation 303 is the color for the modification request in color map 713; as indicated above, that color is black if the modification request has not been "turned on" and otherwise, the color associated with the modification request in color array 1123. Further, if MR status array entry 905 for the modification request is in the state "marked" or the state "marked and active", label 305 for the modification request is drawn next to the modification request representation. Label 305 has the same color as the modification request representation. Finally, in the preferred embodiment, the modification request date scale is drawn to the right of line characterization column 219 and title label 220 is drawn above line characterization column 220.

Implementation of Code Viewers: FIGS. 5, 6, and 14

As explained in the discussion of FIG. 5, when code window button 227 is pushed, the result is the appearance in display 201 of a code window 505 and an associated rectangle 504. When rectangle 504 is positioned over a group of line representations 207, code window 505 displays the lines represented by those line representations 207. Rectangle 504 and code window 505 together make up a code viewer. The preferred embodiment may have up to three code viewers. They are implemented as an array of code viewer objects. FIG. 14 shows the data employed to implement a code viewer object The data falls into four categories: code window information 1403, which describes the lines being displayed in the code viewer's code window 505, file information 1415, which describes the file from which the lines are being displayed, rectangle information 1431, which describes rectangle 504 for the code viewer, and code viewer status 1439, which indicates whether the code viewer is attached.

Beginning with code window information 1403, the data is the following:

maximum lines 1405 indicates the maximum number of lines which can be displayed in window 505;

first display line offset 1407 is the offset of the first line being displayed in window 505 from the first line of the file in code lines 809;

last display line offset 1409 is the offset of the last line being displayed in window 505 from the first line of the file in code lines 809;

display mode pointer 1411 is a pointer to the variable do_split, which indicates whether added lines, deleted lines, or both are to be displayed; and last display mode 1413 indicates the display mode which was in use the last time window 505 was redrawn.

Continuing with file information 1415, that data includes:

File line pointers 1417, which includes a first file line pointer (FFL) 1419 to the first line in code lines 809 of the file from which lines are currently being displayed in code window 505, a current file line pointer (CFL) 1421 to the line at which the center of rectangle 504 is currently positioned, and a last file line pointer (LFL) 1423 to the last line of the file.

First added line array entry pointer (First ALAE) 1425 points to the entry for the first line of the file in added lines array 1005; and first deleted line array entry pointer (First DLAE) 1427 points to the entry for the first line of the file in deleted lines array 1011.

File information 1415 thus provides all of the information needed locate the lines in the file which are currently being displayed in the code window and to display the lines in colors corresponding to the line representations 207 for the lines.

The remaining information defines rectangle 504 and indicates whether the code viewer is attached. Rectangle information 1431 consists of the x and y coordinates 1433 and 1435 of the center of the rectangle and the color of the outline 1437 used for the rectangle and for the associated code window. Code viewer status 1439 has the value TRUE if the code viewer is attached and otherwise FALSE.

Continuing with details of the creation and operation of a code viewer, if a developer activates button 227 with the mouse when there are less than three code viewers in display 210, the result is the creation of a new code viewer. In the course of creation, display mode 1411 is set to the current value of do_split 1003, pointers 1417 are all set to NULL, the color for the new code viewer's borders are determined, minimum sizes for code window 505 and rectangle 504 are set up, and code viewer status 1439 is set to TRUE. The developer then uses the mouse to size the window and rectangle 504 is sized proportionally to the window size.

When there are code viewers in display 207, it is necessary each time the cursor is moved to determine what the relationship is between the cursor and the code viewers. If there is an attached code viewer, cursor 110 is of course attached to that code viewer; otherwise, the program computes for each code viewer the distance between the code viewer's rectangle 504 and the current position of cursor 110 (contained in rectangle infor 1431); if the rightmost mouse button has been pushed, the code viewer whose rectangle 504 is closest to the cursor position is then attached to cursor 110. If there is an attached code viewer when the rightmost mouse button is pushed, that code viewer is detached.

The next step is to relate the currently-attached code viewer to the current cursor position. If the cursor is in a column 205, the program has previously determined which file is represented by that column. To relate the code viewer to the current cursor position, the program sets FFL PTR 1419 to point to the first line in that file, LFL PTR 1423 to point to the last line, and CFL PTR 1421 to point to the current line in the file. First ALAE 1425 and FIRST DLAE 1427 are further set to point to the first entries in added line array 1005 and deleted line array 1011 for the file. Finally, the x and y coordinates 1433 and 1435 are set from the coordinates of the current cursor position.

Creation of a code viewer, attaching it, and relating it to the current cursor position all occur in step 1317 of flow chart 1201, in which the state for the display is set as required by the mouse input. If anything has occurred to change the state of a code viewer, that code viewer is then redrawn in step 1319, redraw line display window. How the code viewer is redrawn depends upon the value of display mode 1411. However, in all cases, the first step is to redraw rectangle 504. Next, the required lines are drawn in code window 505 by determining the first line in code window 505 and then drawing lines until the maximum number of lines in the window is reached. As each line is drawn, the entry for the line in added line array 1005, delete line array 1011, or both (in the case of a split display) is used to determine the index for the modification request in color map 713, the color for the modification request is fetched from color map 713, and the color is then used to draw the line of code.

Using the Display Techniques to Visualize Program Slices

Figure 15:
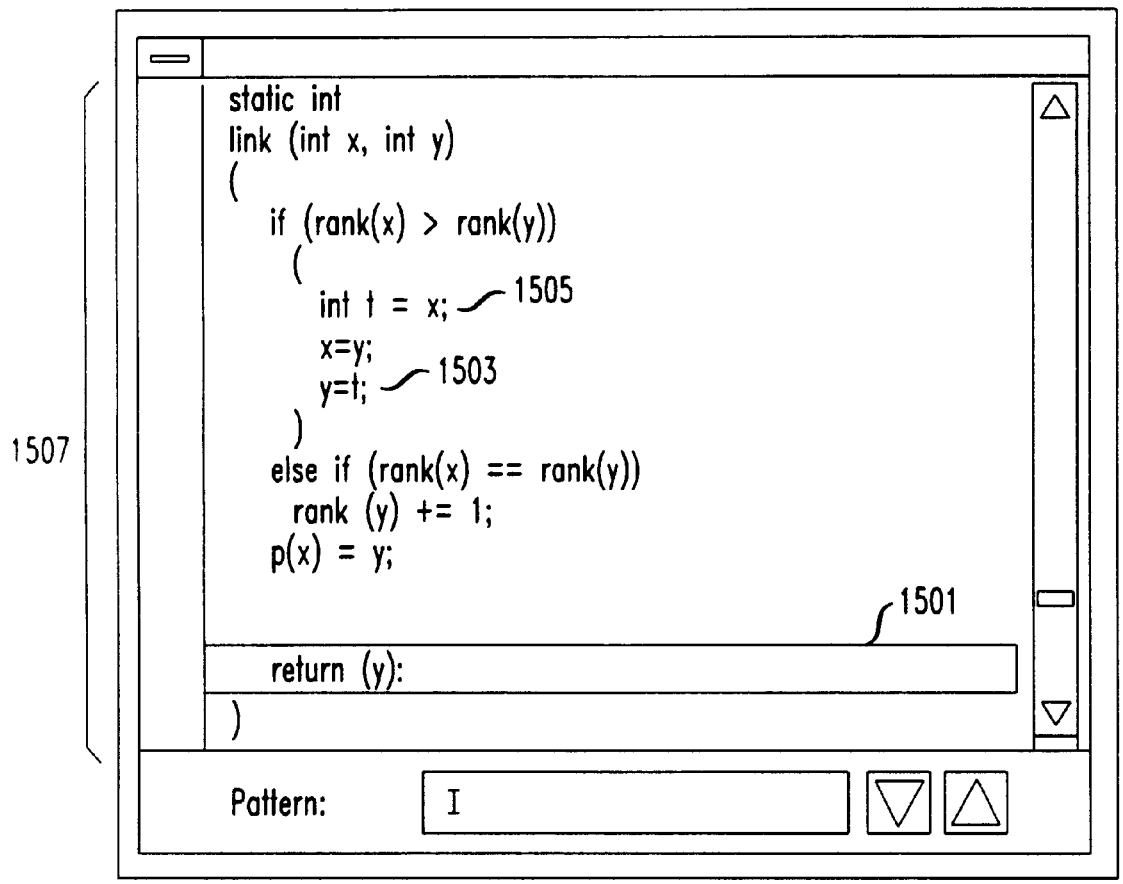
FIG. 15 illustrates a simple slice.
Figure 16:
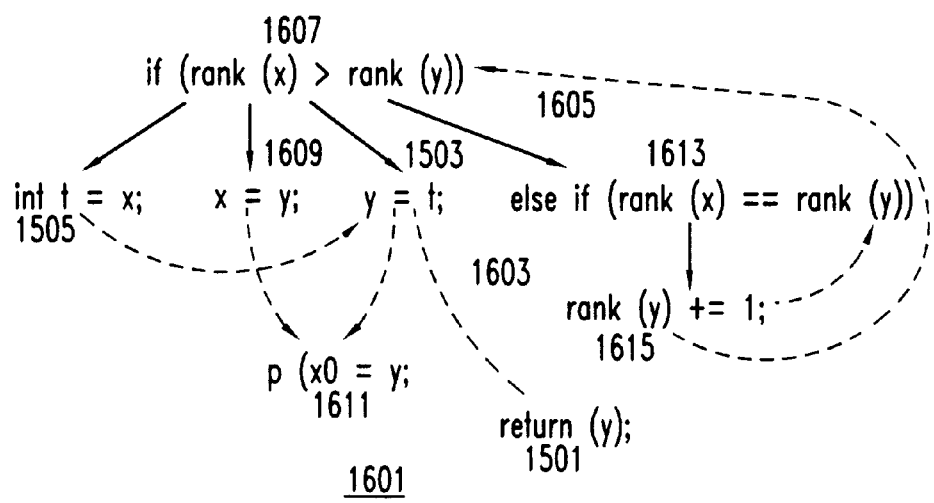
FIG. 16 illustrates the program dependence graph of the slice of FIG. 15.

The display techniques outline above can also be used in apparatus for visualizing program slices. A preferred embodiment of the apparatus for visualizing slices is implemented in the computer system shown in FIG. 1. The following detailed description of this apparatus will first provide more detail about program slices and will then describe the preferred embodiment Program Slicing: FIGS. 15 and 16

Program slices are generally classified along two dimensions. First, a slice has a direction: backwards or forwards. A backwards slice with respect to a component C identifies those components that affect C, while a forward slice with respect to C identifies those components affected by C. Second, a slice can be computed by analyzing a program's source code (referred to as a static slice) or by analyzing one or more executions of a program (a dynamic slice). Static and dynamic slices can be automatically constructed by a variety of methods. For details, see the Weiser reference supra and Horwitz, S., Prins, J., and Reps, T., "Integrating non-interfering versions of programs", *ACM Transactions on Programming Languages and Systems,* Vol. 11(3) pp. 345–387 (July 1989); Korel, B. and Laski, J., "Dynamic program slicing", *Information Processing Letters,* Vol. 29(10) pp. 155–163 (October 1988); and Ferrante, I., Ottenstein, K., and Warren, J., "The program dependence graph and its use in optimization", *ACM Transactions on Programming Languages and Systems,* Vol. 9(5) pp. 319–349 (July 1987).

All of the approaches described in the above references involve examining a program's data and control dependences, for which we give informal descriptions (for more rigorous definitions, see Ferrante, supra). FIG. 15 provides simple examples of these dependences. Statements in the figure which are either data or control dependent on the highlighted 'return (y);' statement 1501 are darker than statements which are not.

Statement s is data dependent on statement r if r writes into a variable V that s subsequently reads from (with no intervening writes to V). In the function link 1507 in FIG. 15, the highlighted statement 1501 'return (y);' is data dependent on statement 1503 'y=t;', which is data dependent on statement 1505 'int t=x;'. Analyzing data dependences in the presence of pointers and arrays is a difficult task given only a program's source code (the problem is generally undecidable). However, the exact data dependences for a particular execution of a program can be easily computed by examining the execution's address trace (the tradeoff is that not all dependences in the program may arise in a given execution). Data dependences can span procedure and file boundaries.

Statement s is control dependent on statement r if r is a predicate that can control whether or not s executes. Control dependences span statements from the same procedure but do not cross procedure or file boundaries. In FIG. 15, statement 1503 'y=t;', is control dependent on its enclosing if conditional. The return statement 1501 is not control dependent on either if statement since it executes regardless of the control-flow path through procedure link 1507.

When combined, the data and control dependences form the edges of a directed graph (the program dependence graph) in which the vertices are the statements of the program. The backwards or forwards slice with respect to a statement may be found by backwards or forwards transitive closure in this graph, identifying the set of statements in the slice. FIG. 16 shows program dependence graph 1601 of function link 1507. The dashed curved edges 1603 represent data dependences and the solid straight edges 1605 represent control dependences. The backwards closure from 'return (y); ' 1501 is obtained by following the edges in the opposite direction indicated by the arrows; in graph 1601, it includes every vertex in the graph except for 'x=y;' 1609 and p[x]=y; 1611, which corresponds to the slice shown in FIG. 15.

Figure 21:
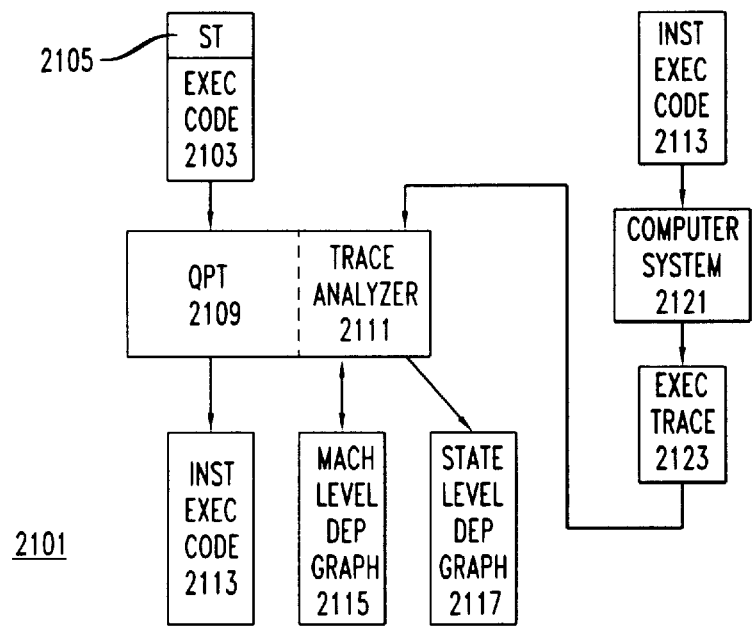
FIG. 21 is a diagram of the process of making the program dependence graph in the preferred embodiment.

Making the Dependence Graph: FIG. 21

In a preferred embodiment, the dependence graph is a statement-level dynamic program dependence graph of a program's execution. The graph is built as shown in FIG. 21: first, we use QPT (Quick Profiling and Tracing) instrumentation tool 2109 to generate program traces of the execution. Tool 2109 instruments an executable code file 2103 by producing an instrumented executable code file 2113 which contains added code to generates a trace of events which are of interest to the tool's user. Such a trace might list the the addresses in memory which the program wrote to or read from. Execution trace 2123 is generated by executing instrumented executable code 2113 in computer system 2121. Trace 2123 is then input as it is generated via a UNIX operating system pipe to a trace analyzer component of QPT 2109. Trace analyzer 2111 analyzes trace 2123 and extracts the dynamic data and control dependences from it to produce statement level dependency graph 2117. Since QPT instruments executable files, dependences are found between machine instructions not source statements. To get dependences between source statements, QPT uses the executable file's symbol table (ST) 2105 to map the dependences between machine instructions to dependences between their corresponding statements at the source level. The result of the analysis is statement-level dynamic dependence graph 2117. An advantage of performing the execution analysis at the object code level is that the statement-level dynamic dependence graph can be produced for source code written in any higher-level language. For details on the QPT tool, see Ball, T. and Larus, J. R., "Optimally profiling and tracing programs", *Conference Record of the Nineteenth ACM Symposium on Principles of Programming Languages,* (Albuquerque, N. Mex., Jan. 19–22, 1992), pp. 59–70 ACM, (1992) and Larus, J. R., "Efficient program tracing", *IEEE Computer Vol.* 26(5) pp. 52–61 (May 1993). Extracting the dependence graph from a trace is explained in detail in the Korel and Laski reference supra.

Figure 17:
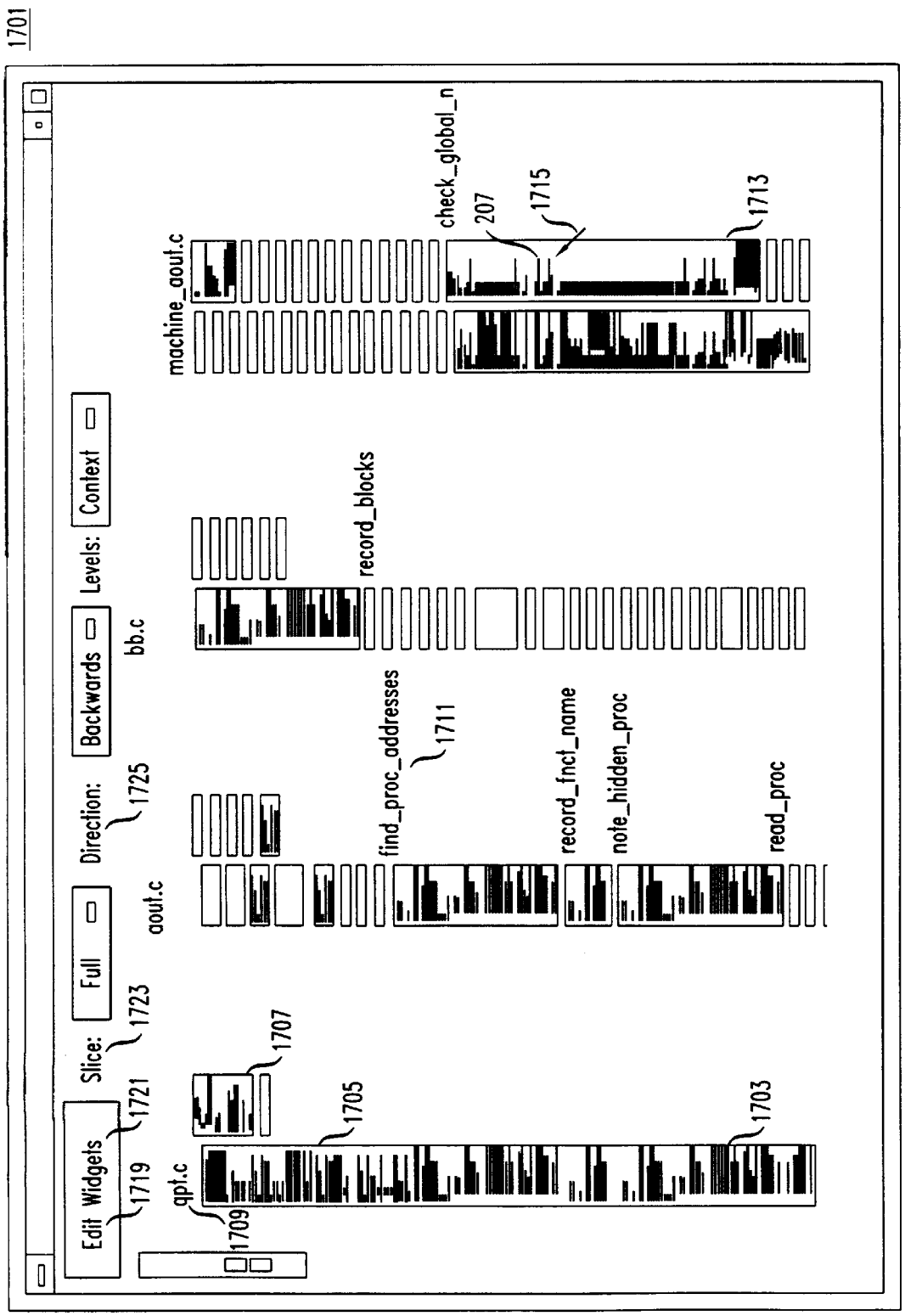
FIG. 17 is a first illustration of the invention's main display screen.

Visualizing the Slice: FIG. 17

FIG. 17 shows how the visualization apparatus displays a slice to the user. Display 1701 is a variation of display 201. A program file is represented by a column 1703, with the file's name 1709 at the top of its column 1703. The column 1703 for a file is divided into blocks 1705 and 1707 representing procedures in the file. A block representing a procedure may either be open or closed. In an open block 1705, each line of the procedure is represented by a line representation 207 in the manner disclosed above. When no slice is being shown, line representations for code which was executed in the trace are shown in black, while line representations for code which was not executed are shown in gray. As above, the line representation 207 shows the indentation and length of the corresponding line of code. A closed block 1707 contains no individual line representations; instead, the size of the block varies according to the number of lines in the procedure it represents. To open a closed block 1705, pointer 1715 is moved to the closed block and the second button on mouse 103 is pushed; the same is done to close an open block 1705.

The user interacts with display 1701 as follows: first the user sets up the slice menu. This is done by means of menus which appear when slice 1723 and direction menu 1725 are selected. Selection of slice menu 1723 causes a menu to appear from which the user can select how much of the slice will appear in the display. The slice shown may be a full slice, namely, one which shows the complete transitive closure for the slice point, or a partial slice which shows only the nodes belonging to the strongly connected component containing the slice point.

The menu which appears when direction menu 1725 is selected controls whether the selected slice is a forward slice, a backward slice, or is bidirectional (i.e. the closure follows the edges in both directions). As will be explained in more detail later, the user may also determine how many steps of the transitive closure from the slice point are shown in the slice.

When slicing is on, the selected slice for a component automatically appears in color in display 1701 when pointer 1715 points to the component In the preferred embodiment, the left-hand mouse button toggles slicing on and off when pointer 1715 is within the area of display 1701 occupied by the columns of files 1703. The default is on. If slicing is on and the left-hand mouse button is depressed and pointer 1715 thus "dragged" across the components, the slice for the component remains on after pointer 1715 moves to the next component. The slices continue to accumulate until the left-hand mouse button is released, turning the slicing off. When the slicing is off, the set of slices being displayed in display 1701 when it was turned off remains on display until the slicing is turned on again.

In the preferred embodiment, a line is selected as the slice point by opening the procedure block 1707 for the procedure if necessary and then moving pointer 1715 to line representation 207 for the line. The line in question must of course have been executed when the trace was made. A procedure is selected by moving pointer 1715 to a closed procedure block 1707; a file is selected by moving the pointer to the file's name 1709.

The manner in which a component of a slice is displayed in color depends on the component With open procedure blocks 1705, the component lines are displayed in color; with closed procedure blocks 1707, the block is highlighted if it is a component of the slice and the block is partially filled in color. The amount of fill shows the proportion of the executed lines of the procedure which are in the slice. If a procedure in the slice is only one step away from the slice point in the transitive closure, the procedure's name is displayed, as at 1711. With files, the file name is displayed in color.

Color is used in display 1701 to show the shortest distance in the slice's transitive closure of a component of a slice from the slice point. As in the range of dates in the example outlined above, the distances are mapped to a spectrum of colors. In the preferred embodiment, the slice point is red and the colors go from red through orange, yellow, and green to blue with increasing distance from the slice point. The greatest distance shown in the slice and the mapping of colors to distance are determined by control window 1803 in FIG. 18. The distance is determined by using mouse 103 to move slider 1804, with the distance increasing as the slider moves from left to right. As the distance increases, the mapping between colors and distances changes. The current mapping is shown in color bar 1806. Where a component such as a file or procedure itself contains components, the component's color is that for the distance of the closest contained component.

Figure 18:
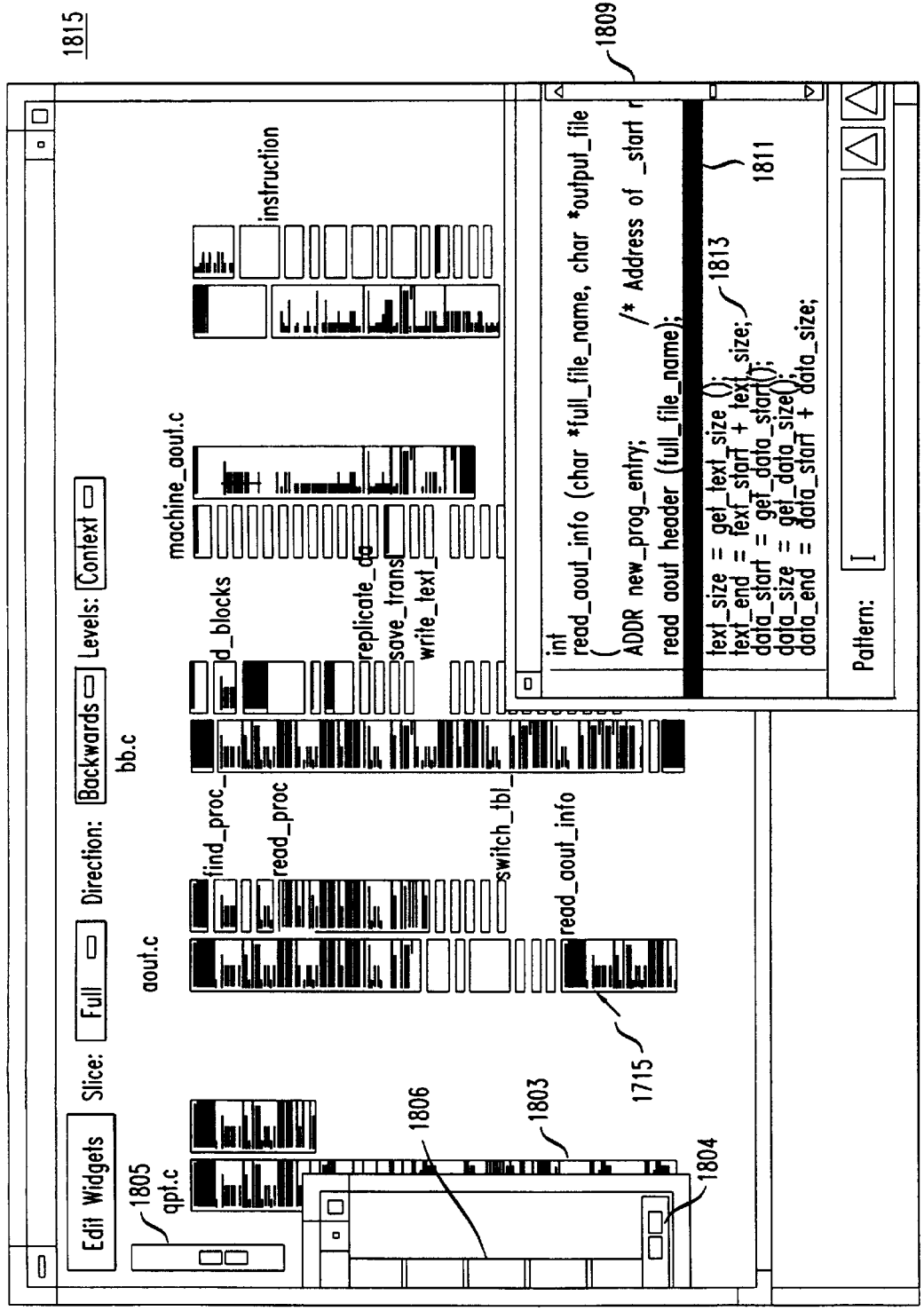
FIG. 18 is a second illustration of the main display screen.

FIG. 18 shows two further components of interest in display 701. Slider 1805 scales the size of closed procedure blocks 1707. If slider 1805 is all the way to the top, all closed procedure blocks 1707 are the same size; the farther slider 1805 is pushed down, the more the size of a closed procedure block 1707 reflects the number of lines of code it contains.

Code browser 1809 appears in response to a menu selection made from a menu which appears when Widgets 1721 is selected. Code browser 1809 tracks pointer 1715 and shows the actual lines of code surrounding the line representation 207 presently specified by pointer 1715. Highlight 1811 marks the line at the location of pointer 1715, and components of the slice in code browser 1809 have the colors required by their distance from the slice point. When slicing is on and code browser 1809 is being displayed, the highlighted line in code browser 1809 is the slice point. In a preferred embodiment, there is only a single code browser 1809 in display 1701; however, the techniques described for employing multiple code windows 505 outlined above might be used for multiple code browsers in display 1701.

When slicing is off, the components of display 1701 can be rearranged to make analysis of the slice easier. The rearrangement is done using a menu which appears when the user selects edit menu 1719. The edit menu 1719 has selections specifying that display 1701 show all of the components being analyzed (the default), that it show only the files which contain components of the slice or slices currently being displayed, or that it show only those procedures in a file which contain components of the slice or slices. The menu also has a selection which causes the files and procedure blocks in the display to be rearranged according to their distance from the slice point. Files are ordered from left to right by their distance to the slice point Within a file procedures are ordered from top to bottom by their distance to the slice point. Thus, the slice point ends up in the upper-left corner of the display. Further selections in the menu specify that all procedure blocks in display 1701 be closed blocks 1707 and that all procedure blocks in the display be open blocks 1705.

Figure 19:
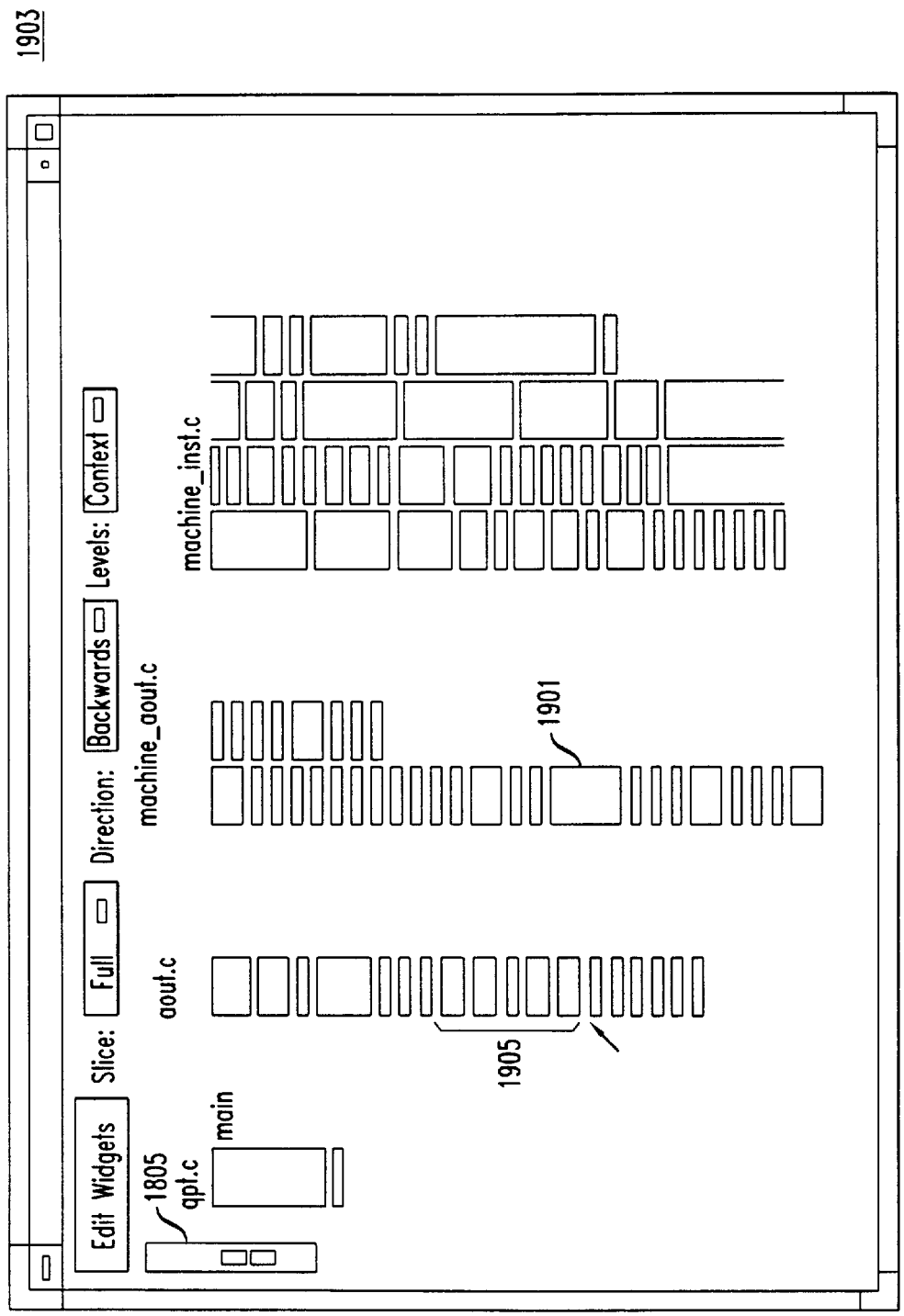
FIG. 19 is an illustration of a backward slice.
Figure 20:
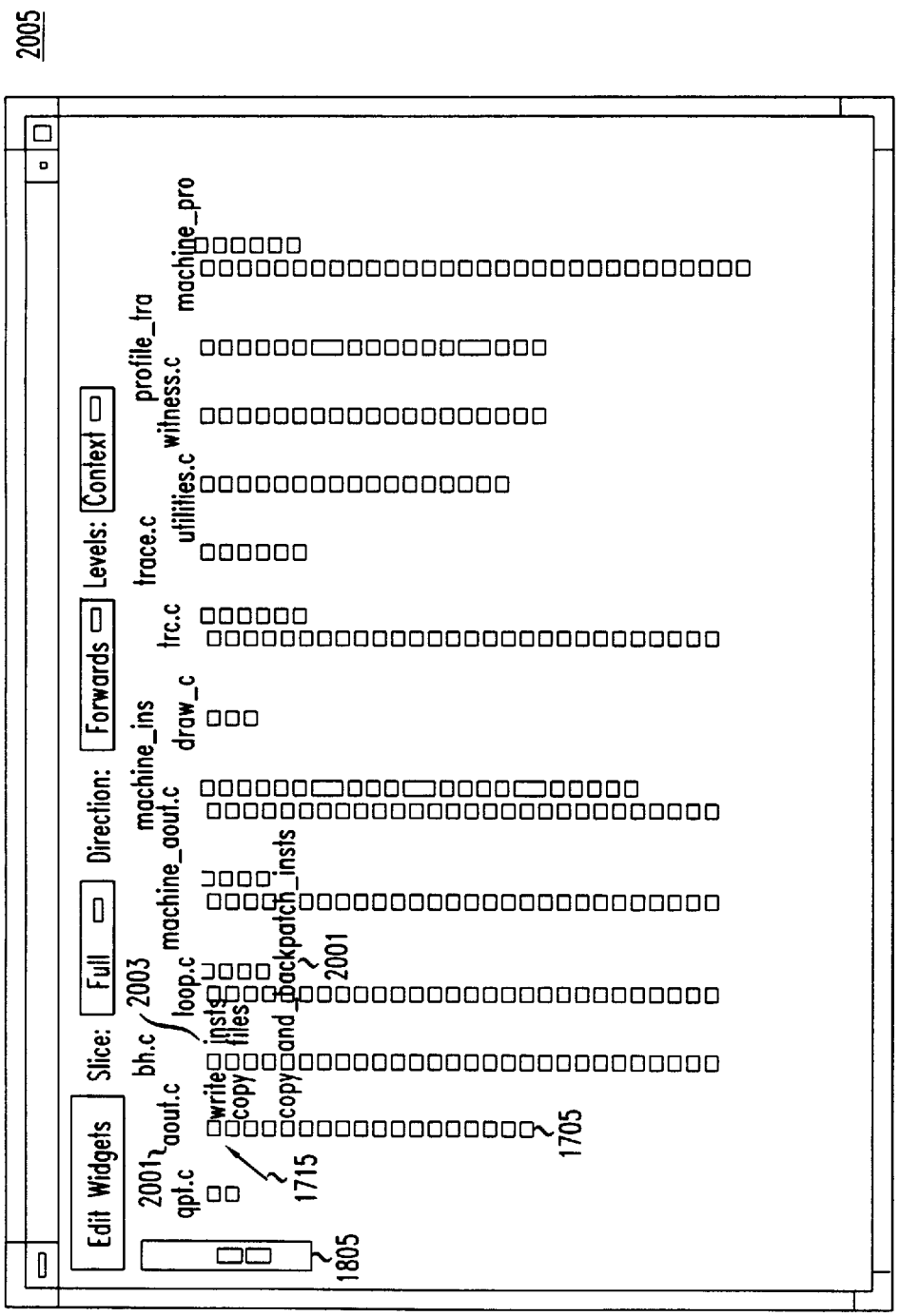
FIG. 20 is an illustration of a forward slice.

Examples of Use of Slice Visualization: FIGS. 18–20

In the following, using slice visualization to analyze an execution of the QPT profiling/tracing tool is described. QPT is written in the C language and has about 300 procedures and 12,000 lines of code, not including libraries. FIG. 20 shows all the files and procedures in the QPT program in a display 1701. Slider 1805 is set so that the size of the procedure blocks 1705 is not much scaled. The display shows closed procedure blocks 1705 for all of the procedures in QPT and shows a full forward slice for the procedure write$_{13}$insts, the slice point 2003 selected by pointer 1715. Components of the slice are identified by the reference number 2001. Procedure blocks 1705 which are components appear with heavy borders in FIG. 20, as do the names of files which contain components of the slice. The procedure names, finally, are names of procedures which are only one step in the transitive closure away from the slice point. As is immediately apparent from FIG. 20, the forward slice for write_insts involves five other files in the program.

QPT has three basic steps:

1. read in an executable file;
2. determine points in the executable to add instrumentation code to;
3. write out the instrumented executable file.

Slicing can be used to answer a number of questions about the relationships between components of QPT, such as:

What groups of procedures and files participate in a computation?

What code and variables are crucial to the computation of the program?(Changing such code and variables will affect the behavior of many parts of the program.)

Does a file or procedure contain several independent computations or just one?

What can be learned from forward slice 2001 in FIG. 20? Forward slice 2001 is small and spans four files. The procedures in slice 2001 collectively output the instrumented executable file. The procedures that deal with the executable file format are in aout.c, those that deal with machine-independent instrumentation are in prof_trace.c and those that handle machine-dependent instrumentation are in machine_inst.c and machine_prof_trace.c. This is a natural organization for porting the QPT tool to different platforms, but one which is difficult to discover using browser-based slicing interfaces. The slice visualization makes the organization immediately apparent.

FIG. 19 shows how slice visualization can be further used to investigate the procedures in the file aout.c. FIG. 19 is a backwards slice 1901 on the procedure read_proc. Display 1903 has been set to display only files which contain components of slice 1901. Slider 1805 has further been set to specify a greater degree of scaling of procedure blocks 1705. Backward slice 1901 immediately reveals that the components of the slice in the file are five procedures 1905, all of which are at a distance of 1 from read_proc, and that there are components of the slice in only two other files: machine_aout.c and machine_inst.c. When backward slices are done on each of the five procedures 1905, it is found that a slice on any one of the five procedures includes all five procedures and that each backwards slice is relatively small. A forwards slice on any of them, however, turns out to include almost all the procedures in the program. These five procedures 1905, (read_aout_info, find_proc_addresses, record_fnct_name, note_hidden_proc, read_proc) collaborate in reading in an executable file and initializing data structures. Not surprisingly, most of the other procedures in QPT depend on these data structures.

Display 1815 in FIG. 18 shows how program slicing can be used to find important variables. If we use browser 1809 to examine the text of the procedure read_aout_info, we find that it initializes a number of global variables (text_start, text_size, data_start) corresponding to the starting addresses and sizes of various segments in the executable file. The size of the forward slice with respect to each variable's definition will indicate how crucial each variable is to the program's computation. FIG. 18 shows a forward slice with respect to the variable text_start, which receives a value in the assignment statement highlighted at 1811. Each procedure displayed with a name in display 1815 directly references text_start. Other procedures in the slice are indirectly influenced by the value of text_start. While only five files are shown in this figure, the forward slice with respect to text_start influences most of the code in the program.

In the above analysis (done by slicing only on procedures and statements in the file aout.c), we have learned the following:

There are five highly interdependent procedures in the file that read the input to QPT, on which most of the program is dependent.

There is a set of interdependent procedures spanning four files that collectively output the instrumented file.

The variable text_start influences a large portion of the program.

As may be seen from the foregoing examples, there are many different possible applications for program slice visualization. As part of a system for program understanding and reverse engineering, program slice visualization can be used to identify related procedures and files and to extract and restructure code. Applied to debugging, program slice visualization provides help in identifying code that contributes to anomalous program behavior. In addition, the global overview of a program given provided by program slice visualization makes unexpected dependences between program components apparent. Finally, the tool can be used in performance tuning to identify executed code which does not contribute to a program's output.

DETAILED IMPLEMENTATION OF A PREFERRED EMBODIMENT

The following discussion of the detailed implementation of the preferred embodiment will first describe the principal data structures employed in the preferred embodiment and then disclose how the data structures are used first to determine the dependence graph for the slice or set of slices selected by the user and then to display the slice.

Figure 22:
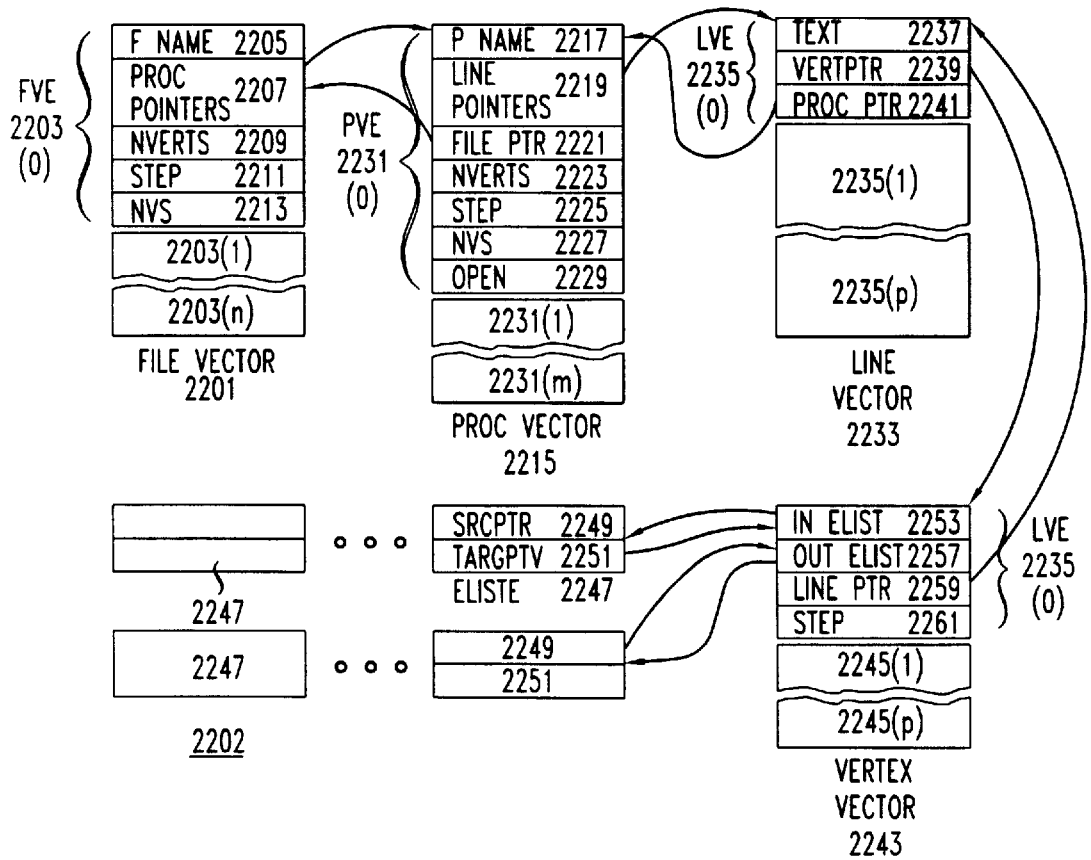
FIG. 22 is a diagram of the principal data structures in the preferred embodiment.

Data Structures Employed in the Preferred Embodiment: FIG. 22

FIG. 22 shows the data structures employed in the preferred embodiment to represent the files, procedures, and lines of the programs being displayed in display 1701 and to represent the vertices and edges of dependence graph 1601. File vector 2201 contains a file vector element (FVE) 2203 for each file in the program being displayed. The file vector elements 2203 are in the left-to-right order in which the files are displayed in display 1701 before rearranging. Each file vector element 2203 has fields for information representing the file name (Fname) 2205, procedure pointers 2207 to the data structures for procedures contained in the file, the number of vertices (or lines) contained in the file, (Nverts 2209), the minimum distance of any of the vertices representing lines in the file from the slice point (step 2211), and the number of vertices in the current slice which represent lines contained contained in the file (NVS) 2213. Not shown in FIG. 22 are fields of FVE 2203 which contain the coordinates of the column 1703 representing the file in display 1701.

There is a procedure vector 2215 for each file. Procedure vector 2215 contains a procedure vector element (PVE) 2231 for each procedure in the file. The procedure vector elements 2231 have the same order as the procedures have in the file to which they belong. The fields of interest in procedure vector element 2231 include procedure name (Pname) 2217, which contains the procedure's name, line pointers 2219, which are pointers to the data structures for the lines contained in the procedure, and file pointer 2221, which is a pointer back to file vector element 2203 for the file which contains the procedure represented by procedure vector element 2231. Nverts 2223, step 2225, and NVS 2227 are each analogous to the field with the same name in file vector entry 2203, except that they concern vertices and distances for lines in the procedure. Not shown in FIG. 22 are fields of PVE 2231 which contain the coordinates of the procedure block 1705 or 1707 representing the procedure in display 1701.

There is a line vector 2233 for each procedure in the program. Line vector 2233 contains a line vector element (LVE) 2235 for each line in the procedure. Each line vector element 2235 contains three fields. The first field contains text 2237 for the line; the second is a pointer (vertptr 2239) to the vertex in dependence graph 1601 for the line; the third is a pointer (proc ptr 241) back to the procedure containing the line.

Vertex vector 2243, finally, contains a vertex vector element (LVE) 2245 for each vertex in dependence graph 1601. There are as many vertices in the dependence graph as there are lines in the program. Each vertex vector element 2245 contains four fields. The first field is a pointer (In Elist) 2253 to a list of data structures 2247 representing edges which end at the vertex represented by vertex vector element 2245. The second field is a pointer (Out Elist) 2257 to a list of data structures 2247 representing edges which begin at the vertex. Each data structure 2247 (ElistE) represents one edge by means of a pointer (SrcPtr 2249) to the vertex at which the edge begins and a pointer (TargPtr 2251) to the vertex at which the edge ends. Continuing with the remaining fields in vertex vector 2243, line pointer 2259 points to the line corresponding to the vertex represented by vertex vector entry 2245 and step 2261 contains the shortest distance of the vertex from a slice point for which the slice is currently being displayed.

As is apparent from the foregoing description, principal data structures 2202 of FIG. 22 permit easy and rapid determination of the relationships between vertices, lines, procedures, and files. Starting at vertex vector entry 2245 for a vertex, it is easy to locate the corresponding line, the procedure to which the line belongs, and the file to which the procedure belongs. Similarly, starting with a file or procedure, it is easy to determine what vertices correspond to lines in the file or procedure. The Fname field 2205, the step field 2211, the NVS field 2213 and the coordinate fields contain the information needed to properly display the file and the same is true of the corresponding fields in procedure vector entry 2231. The open field in that entry further indicates whether the corresponding procedure block is to be open or closed.

Rearrangement of file columns 1703 and procedure blocks 1705 and 1707 in display 701 is handled by means of a file display vector (not shown) which parallels file vector 2201 and procedure display vectors (also not shown) which parallel each procedure vector 2215. The file display vector contains a pointer to each of the file vector entries 2203; initially, the pointers are in the same order as the file vector entries 2203; rearranging of the display of file columns is done by rearranging the order of the pointers in the file display vector and displaying the file columns in the order of the pointers. The procedure display vectors are used in the same fashion to handle rearrangement of the display of procedure blocks.

Figure 23:
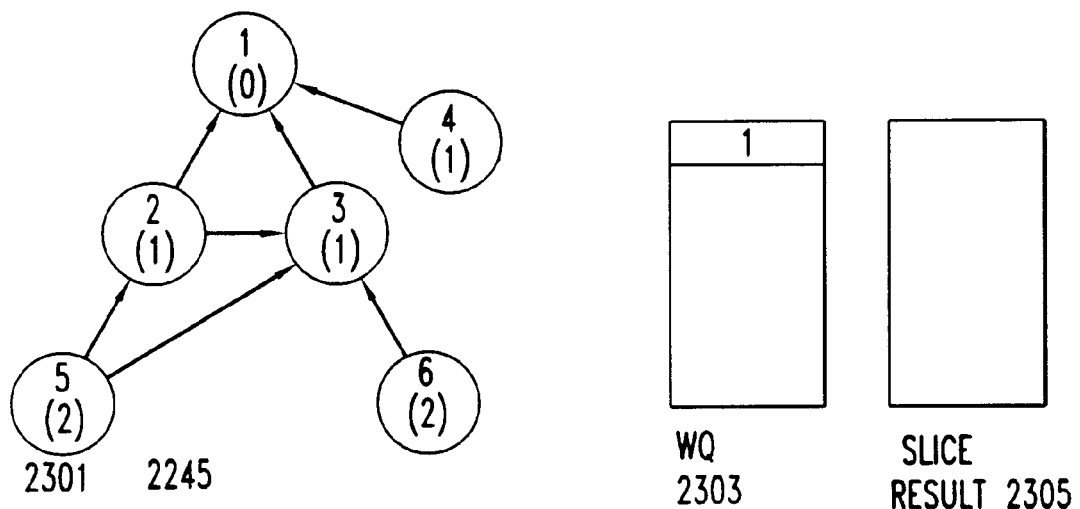
FIG. 23 is a diagram illustrating the algorithm used to produce a slice in the preferred embodiment Reference numbers employed in the Drawing and the Detailed Description have two parts. The two least significant digits specify the number of an item in a figure; the remaining digits specify the figure in which the item first appears; thus, an item with the reference number 603 is first shown in FIG. 6.
Figure 23:
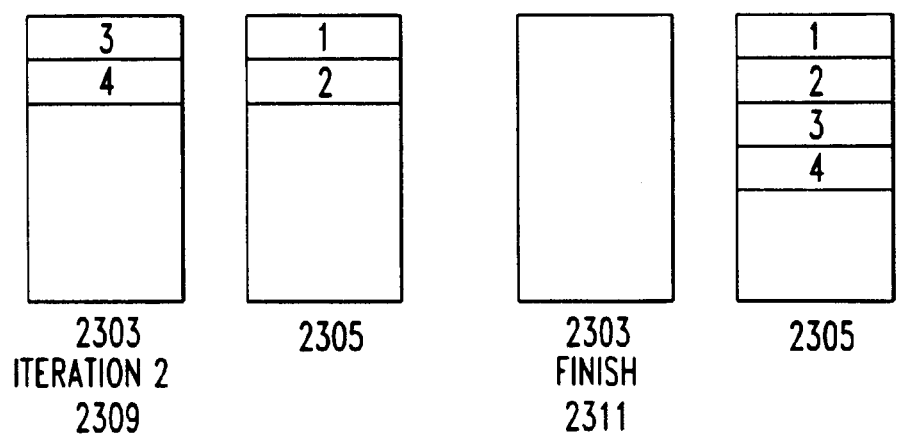

Computing a Slice in the Preferred Embodiment: FIG. 23

As previously mentioned, a slice is specified by using mouse 103 to select: 1) one or more line representations 207 in an open procedure block 1705, 2) a procedure block 1707 or 1705, or 3) a file name 1709. The effect of the selection is to make the lines corresponding to the selected line representations or all of the lines in the selected procedure or file into slice points. The preferred embodiment then computes the slice by retrieving the vertex vector elements 2245 for the lines selected as slice points and following the pointers in the vertex vector elements and the vertex vector elements to the VVEs 2295 to which those pointers point as required by the slice direction. The result of the computation is a list of vertex vector elements 2245 which are ordered by increasing distance from the slice points, up to the maximum distance specified for the slice.

FIG. 23 shows in detail how a backwards slice with a maximum distance equal to one is computed. There are 6 vertices 2245 in backwards transitive closure 2301 containing the slice. Each vertex is numbered and the distance of the vertex from vertex 1, which is the slice point, is indicated in parentheses below the node number. There are thus four vertices 2245, namely 1,2,3, and 4, which are in the slice. 5 and 6 are not because their distance is greater than 1. The pointers pointing to each vertex are the target pointers 2251 in the vertex's In Elist 2253. The source pointers 2219 in the InElist can be used to find the vertices. There are two queues, working queue 2303, which contains pointers to vertices to be processed by the algorithm, and slice result 2305, which contains pointers to the vertices which have been processed.

FIG. 23 shows three stages of the computation, the start, at 2307, the second iteration, at 2309, and the finish at 2311. At the start, working queue 2303 contains a pointer to vertex 1 and slice result 2305 is empty. Step 2261 in vertex 1 is set to 0 and the pointer to vertex 1 is moved to the tail of slice result 2305. Vertex 1's step 2261 is less than the maximum distance, so for each of the vertices which points to vertex 1, the algorithm checks whether the vertex is already in work queue 2303 or slice result 2305. If it is not, the vertex is added to working queue 2303 and its step 2261 field is set to one more than the value of step 2262 in the vertex to which the vertex being added points. At the end of the first iteration, slice result 2305 contains a pointer to vertex 1, while working queue 2303 contains pointers to vertices 2,3, and 4. Step 2261 has been set to 0 in vertex 1 and to 1 in vertices 2,3, and 4.

On the second iteration, vertex 2 is at the head of working queue 2303. It is added to the tail of slice result 2305, but its step field 2261 has a value which is equal to the maximum distance, so vertex 5 is not added to working queue 2303. At the end of the second iteration, working queue 2303 contains pointers to vertices 3 and 4 and slice result contains pointers to vertices 1 and 2. In the next iteration, vertex 3 is the head node in working queue 2303; it is added to the tail of slice result 2305, but none of the three vertices which points to vertex three is added to working queue 2303. Vertices 2, 5, and 6 are not added because vertex 3's step field has a value which is equal to the maximum distance. In the last iteration, vertex 4 is the head vertex; it has no vertices pointing to it, so it is simply added to the tail of slice result 2305. Since working queue 2303 is now empty, the algorithm terminates with slice result 2305 containing pointers to vertices 1,2,3, and 4. The vertices are ordered in slice result 2305 by distance from the slice point.

The same techniques are used to compute the forward and bidirectional slices, except that in the case of the forward slice, the pointers in Out EList 2257 are followed, and in the case of the bidirectional slice, the pointers in both In Elist 2253 and Out Elist 2257 are followed.

Displaying the Slice

In the preferred embodiment, a first list is maintained of pointers to the vertex vector entries 2245, the file vector entries 2203, and the procedure vector entries 2231 for the vertices, files, and procedures in the slice which is presently being displayed and a second list for the vertices, files and procedures in the new slice. When the user selects a component of display 1701 as a slice point, the preferred embodiment determines from the position of pointer 1715 in the display what component is being pointed to, computes the new slice as required for that component, and makes the list of vertices, files, and procedures for the new slice, Next, the preferred embodiment computes NVS 2213 for each file and procedure in the list for the new slice. That is done for procedures by taking the vertex vector entry 2245 for each vertex on the list, following line ptr 2259 to the line-vector entry 2235 corresponding to the vertex, and following procedure pointer 2241 to the procedure vector entry 2231 for the procedure to which the line belongs. Each time a procedure vector entry 2231 is reached, its NVS 2227 is incremented. The same thing is done with files, with file pointer 2221 being followed from procedure vector entry 2231 to file vector entry 2203.

The preferred embodiment then computes step 2211 for each file and procedure in the list for the new slice. That is done in the case of procedures by following the line pointers 2219 in the procedure's procedure vector entry 2231 to the line vector entries 2235 for the lines and following the vertex pointers 2239 in the line vector entries 2235 to the vertex vector entries. The minimum value of step 2261 in all of the vertex vector entries 2245 corresponding to the lines in the procedure which are in the slice is assigned to step 2225 in the procedure vector entry. The same thing is done with files, with the minimum value of step 2225 in the procedure vector entries 2231 for the procedures in the file which are in the slice being used to set step 2211 in file vector entry 2203 for the file.

The next stage is to set up the display of the new slice in display 1701. The first step here is to display all file names, procedure blocks, and line representations for files, procedures, and lines which are not in the new slice in gray. That is done by determining which files are in the first list but not in the second and graying out the file names corresponding to those files. The same is done with closed procedure blocks 1707 for procedures not in the slice.

Then the display of the new slice is set up. That is done as follows: first, the name of each file in the new slice is drawn in the color corresponding to the value of step 2211 for the file. Then each procedure block is drawn. If open 2229 in procedure vector entry 2231 for the procedure indicates that the procedure is closed, a closed block 1707 is drawn in the color required by the value in step 2225 in the procedure's procedure vector entry 2231. If open 2229 indicates that the procedure is open, line pointers 2219 and vertex pointers 2239 are followed to determine whether a line is in the slice and if it is, what the value of step 2261 is for its vertex. If the line is not in the slice, it is drawn in gray; if it is in the slice, the line is drawn in the color determined by the value of step 2261 for the corresponding vertex. Finally, the second list becomes the first list.

The display which has been set up as just described will be displayed substantially in the fashion described in the section "Operation of the Preferred Embodiment", outlined above. When closed procedure blocks 1707 are displayed, they will be scaled as determined by Nverts 2223 in the procedure vector entries 2232 for their procedures and procedure blocks 1707 for procedures in the slice will be filled as determined by the value of number of vertices in the slice 2229 in their procedure vector entries 2231. The order of the files columns and procedure blocks in display 1701 will be determined by the display lists as described above.

CONCLUSION

The foregoing Detailed Description has disclosed how to make and use an apparatus for visualizing program slices to those skilled in the arts to which the invention pertains. The techniques employed in visualizing program slices are of course not limited to that application, but may be applied to the visualization of dependences among entities of any kind. For example, the techniques described herein could be applied in the system for displaying information about data base schemata, disclosed in U.S. Ser. No. 08/114,885, S. G. Eick, et al., *Graphical Display of Relationships,* filed Oct. 22, 1993, and could also be used to examine run-time patterns of record access in data base systems. The display of the entities in such systems would of course vary with the kind of entity. Such systems may further use techniques which are analogous to the preferred embodiment's use of color to show distance, its use of procedure and file representations as well as line representations, its use of scaling to show the number of lines in the procedure representation, and its use of filling to show the number of lines in a procedure which belong to the slice, as well as permitting the user to open the procedure representation to see representations of the lines themselves may be employed in such applications as well. There may similarly be a viewer which permits the user to see details of an entity and a way of rearranging the entity representations according to their distance from the slice point.

The preferred embodiment disclosed herein is the best presently known to the inventors. It will, however, be immediately apparent to those skilled in the art that many alternate implementations are possible. Different data structures than those disclosed herein may be used to represent the dependence graph and the entities which may belong to the slice, and the techniques used to compute and display the slice will depend upon those representations and upon the characteristics of the graphical display system.

Because the techniques disclosed herein are very general in their application, and because many alternate implementations are possible, the the implementation disclosed herein is to be regarded in all respects as merely illustrative and exemplary and the invention claimed herein is not defined by the disclosed implementation, but instead by the claims as interpreted with the full breadth permitted by the patent laws.

What is claimed is:

1. An apparatus capable of displaying elements of a system, the apparatus implemented using a computer system comprising a processor and a memory, the apparatus comprising:

a display device capable of rendering a display, the display including a plurality of symbolic representations, each symbolic representation representing at least one of the elements of the system;

a pointing device controllable by a user of the apparatus to select one of the plurality of symbolic representations, wherein the at least one element of the system represented by the selected symbolic representation is selected as a slice point; and a slice displaying system executable on the processor that determines, based on the selected slice point, a subset of the elements of the system that belong to a slice of the system taken at the slice point, and that alters an appearance of each symbolic representation representing at least one of the subset of elements belonging to the slice.

2. The apparatus of claim 1, wherein each element of the system has an information content and the symbolic representations do not represent the information content of the elements of the system.

3. The apparatus set forth in claim 1 wherein:

certain of the symbolic representations represent a plurality of the elements of the system; and the apparatus further comprises means for altering the appearance of a selected one of the certain symbolic representations to display second symbolic representations of each of the plurality of elements represented by the selected certain symbolic representation.

4. The apparatus set forth in claim 1 wherein:

the apparatus displays slices of a program; and the symbolic representations represent procedures of the program.

5. Apparatus, implemented using a computer system including a display device and a processor, capable of displaying an entity of a system, the entity containing subentities of the system, the apparatus comprising:

a display in the display device displaying:

a selector controlled by a user of the apparatus, and at least one symbolic representation of the entity, each symbolic representation comprising one of:

a closed symbolic representation of the entity which displays no representations of the subentities, or an open symbolic representation of the entity which displays symbolic representations of the subentities; and a display generator executable on the processor to generate each of the at least one symbolic representation as the closed symbolic representation or the open symbolic representation as specified by the selector.

6. The apparatus as set forth in claim 5 wherein a manner in which a closed symbolic representation is displayed varies according to information about a subentity in the entity represented by that closed symbolic representation.

7. The apparatus set forth in claim 6 wherein the manner in which the closed symbolic representation is displayed varies according to information about all of the subentities corresponding to that symbolic representation.

8. The apparatus set forth in claim 7 wherein the display device is a color display device and a color of each closed symbolic representation varies according to the information.

9. The apparatus set forth in claim 7 wherein a shape of each closed symbolic representation varies according to the information.

10. The apparatus set forth in claim 9 wherein a fill of each closed symbolic representation varies according to the information.

11. The apparatus set forth in claim 5 wherein an appearance of a symbolic representation of a subentity in an open symbolic representation of the entity varies according to information about the subentity.

12. The apparatus set forth in claim 11 wherein:

the display device is a color display device; and a color of the symbolic representation of the subentity varies according to the information.

13. The apparatus set forth in claim 11 wherein a shape of the symbolic representation of the subentity varies according to the information.

14. The apparatus set forth in claim 13 wherein each of the symbolic representations of the subentities is a line one pixel in width.

15. The apparatus set forth in claim 14 wherein each subentity is a line of text.

16. The apparatus set forth in claim 6 wherein the display device is a color display device and a color each closed symbolic representation varies according to the information.

17. The apparatus set forth in claim 5 wherein a shape of each closed symbolic representation varies according to the information.

18. The apparatus set forth in claim 17 wherein a fill of each closed symbolic representation varies according to the information.

19. The apparatus set forth in claim 12 wherein each of the symbolic representations of the subentities is a line one pixel in width.

20. The apparatus set forth in claim 19 wherein each subentity is a line of text.

21. The apparatus set forth in claim 11 wherein each of the symbolic representations of the subentities is a line one pixel in width.

22. The apparatus set forth in claim 21 wherein each subentity is a line of text.

23. The apparatus set forth in claim 5 wherein each of the symbolic representations of the subentities is a line one pixel in width.

24. The apparatus set forth in claim 23 wherein each subentity is a line of text.

* * * * *